United States Patent
Torii et al.

(10) Patent No.: US 12,398,266 B2
(45) Date of Patent: Aug. 26, 2025

(54) POLYCARBONATE RESIN COMPOSITION

(71) Applicant: IDEMITSU KOSAN CO., LTD, Tokyo (JP)

(72) Inventors: Takahiro Torii, Taipei (TW); Koichi Suga, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 750 days.

(21) Appl. No.: 17/274,848

(22) PCT Filed: Sep. 11, 2019

(86) PCT No.: PCT/JP2019/035597
§ 371 (c)(1),
(2) Date: Mar. 10, 2021

(87) PCT Pub. No.: WO2020/054741
PCT Pub. Date: Mar. 19, 2020

(65) Prior Publication Data
US 2022/0049088 A1    Feb. 17, 2022

(30) Foreign Application Priority Data
Sep. 14, 2018    (JP) .................. 2018-173123

(51) Int. Cl.
*C08L 69/00* (2006.01)
*C08G 64/24* (2006.01)
*C08L 27/18* (2006.01)

(52) U.S. Cl.
CPC .............. *C08L 69/00* (2013.01); *C08G 64/24* (2013.01); *C08L 27/18* (2013.01); *C08L 2205/035* (2013.01)

(58) Field of Classification Search
CPC ...................................... C08L 69/00
See application file for complete search history.

(56) References Cited

U.S. PATENT DOCUMENTS

| | | | | |
|---|---|---|---|---|
| 6,462,111 B1 * | 10/2002 | Singh | .................. | C08K 5/098 524/157 |
| 9,097,838 B2 | 8/2015 | Takimoto et al. | | |
| 9,664,818 B2 | 5/2017 | Kawai | | |
| 10,059,840 B2 | 8/2018 | Kawai | | |
| 11,525,056 B2 * | 12/2022 | Yamazaki | ............... | G02B 1/045 |
| 2002/0177643 A1 * | 11/2002 | Dobler | ................. | C08K 5/0066 524/392 |
| 2003/0027905 A1 * | 2/2003 | Mahood | ............... | C08K 5/0066 524/394 |
| 2009/0137709 A1 * | 5/2009 | Krauter | ................... | C08L 69/00 524/157 |
| 2012/0309874 A1 | 12/2012 | Takimoto et al. | | |
| 2013/0066002 A1 | 3/2013 | Kawai | | |
| 2013/0082222 A1 * | 4/2013 | Aoki | ..................... | C08G 77/448 252/601 |
| 2014/0179843 A1 | 6/2014 | Van Der Mee et al. | | |
| 2015/0045483 A1 | 2/2015 | Ueda et al. | | |
| 2015/0307707 A1 | 10/2015 | Jung et al. | | |
| 2016/0272758 A1 * | 9/2016 | Takimoto | ................ | C08L 71/02 |
| 2016/0297924 A1 | 10/2016 | Takimoto et al. | | |
| 2019/0185663 A1 | 6/2019 | Kawai | | |
| 2022/0056263 A1 * | 2/2022 | Torii | ..................... | C08K 5/527 |

FOREIGN PATENT DOCUMENTS

| | | |
|---|---|---|
| CN | 102906195 A | 1/2013 |
| CN | 104812825 A | 7/2015 |
| CN | 104870563 A | 8/2015 |
| CN | 105907074 A | 8/2016 |
| CN | 106633755 A | 5/2017 |
| JP | 4069364 B2 | 4/2008 |
| JP | 2011-502208 A | 1/2011 |
| JP | 2015-093913 A | 5/2015 |
| JP | 5714576 B2 | 5/2015 |
| JP | 6133644 B2 | 5/2017 |
| TW | 200940622 A | 10/2009 |
| WO | WO-2011/149030 A1 | 12/2011 |
| WO | WO-2013/129310 A1 | 9/2013 |

OTHER PUBLICATIONS

Japanese Office Action issued in connection with JP Appl. Ser. No. 2018-173123 dated Oct. 18, 2022.
(Continued)

*Primary Examiner* — Irina Krylova
(74) *Attorney, Agent, or Firm* — Foley & Lardner LLP

(57) ABSTRACT

Provided is a polycarbonate-based resin composition, including: a polycarbonate-based resin (A) containing at least one of a branched polycarbonate-based resin (A-1) or an aromatic polycarbonate-based resin (A-2) except the branched polycarbonate-based resin (A-1); a fluorine-containing compound (B) having such a hydrocarbon structure that all hydrogen atoms of the hydrocarbon structure are substituted with fluorine; and a polyether (C) having a polyoxyalkylene structure, wherein a content of the polyether (C) having a polyoxyalkylene structure is 0.02 part by mass or more and 2.0 parts by mass or less with respect to 100 parts by mass of the polycarbonate-based resin (A), and wherein a mass ratio of the fluorine-containing compound (B) to the polyether (C) is 15.00 or less.

11 Claims, No Drawings

(56) References Cited

OTHER PUBLICATIONS

International Searching Authority, "International Search Report," issued in connection with International Patent Application No. PCT/JP2019/035597, dated Sep. 11, 2019.
Japanese Office Action issued in the corresponding Japanese Application No. JP2018-173123, dated Apr. 5, 2022.
Office Action issued in corresponding Taiwanese Patent Application No. 108132956, dated May 22, 2023.
Office Action issued in corresponding Chinese Patent Application No. 201980060077.9, dated Sep. 30, 2022.

* cited by examiner

POLYCARBONATE RESIN COMPOSITION

CROSS-REFERENCE TO RELATED APPLICATIONS

The present application claims priority under 37 U.S.C. § 371 to International Patent Application No. PCT/JP2019/035597, filed Sep. 11, 2019, which claims priority to and the benefit of Japanese Patent Application No. 2018-173123, filed Sep. 14, 2018. The contents of these applications are hereby incorporated by reference in their entireties.

TECHNICAL FIELD

The present invention relates to a polycarbonate-based resin composition and a molded article thereof.

BACKGROUND ART

A polycarbonate resin is excellent in, for example, transparency, mechanical properties, thermal properties, electrical properties, and weatherability. Through utilization of those characteristics, the polycarbonate resin has been used in various optical molded articles, for example, lighting equipment diffusion covers each made of a resin, such as a lighting cover and a display cover, and a lens. Any such optical molded article is required to have a high transmittance and the like as well as thin-wall flame retardancy. However, a total light transmittance, which serves as one of the indicators representing transparency, of the polycarbonate resin is lower than that of, for example, polymethyl methacrylate (PMMA). Accordingly, a product including an optical molded article made of a polycarbonate-based resin and a light source is poor in luminance, and hence there is a demand for improvement. In addition, with a view to obtaining higher flame retardancy, there are reports of; use of a branched polycarbonate resin as the polycarbonate resin; and a polycarbonate-based resin composition containing a flame retardant, such as a polytetrafluoroethylene.

For example, Patent Document 1 relates to a flame-retardant light-diffusing polycarbonate resin composition containing an aromatic polycarbonate resin, an organometallic salt compound, and a polytetrafluoroethylene. Patent Document 2 relates to a flame-retardant light-diffusing polycarbonate resin composition containing polycarbonates including a branched polycarbonate and an aromatic polycarbonate, a flame retardant, and a polytetrafluoroethylene. Patent Document 3 relates to an aromatic polycarbonate-based resin composition having its light transmittance and luminance improved by incorporating a specific polyoxyalkylene glycol. Patent Document 4 relates to an aromatic polycarbonate resin composition for a light-guiding plate, containing an aromatic polycarbonate resin, and a polyalkylene glycol or a fatty acid ester thereof.

CITATION LIST

Patent Document

Patent Document 1: JP 6133644 B2
Patent Document 2: JP 5714576 B2
Patent Document 3: WO 2011/083635 A1
Patent Document 4: JP 4069364 B2

SUMMARY OF INVENTION

Technical Problem

Both the compositions of Patent Documents 1 and 2 are excellent in flame retardancy, but have a problem in that, when the amount of the polytetrafluoroethylene is increased, the total light transmittance is reduced. In addition, in Patent Document 1, a benzotriazole-based UV absorber is used as a UV absorber, and its absorption wavelength ranges to a visible light region. Accordingly, there is a problem in that the composition to be obtained is poor in transparency. The compositions disclosed in Patent Document 3 and Patent Document 4 are insufficient for obtaining flame retardancy, in particular, excellent thin-wall flame retardancy.

In view of the foregoing, an object of the present invention is to provide a polycarbonate resin composition excellent in transparency, in particular, total light transmittance. A further object of the present invention is to provide a polycarbonate-based resin composition excellent in both of transparency (high total light transmittance) and flame retardancy, in particular, thin-wall flame retardancy.

Solution to Problem

The inventors of the present invention have made extensive investigations, and as a result, have found that a polycarbonate-based resin composition including a polycarbonate-based resin and specific compounds in a combination of specific amounts achieves the above-mentioned objects. Thus, the inventors have completed the present invention. That is, the present invention provides the following polycarbonate-based resin composition and molded article thereof.

[1] A polycarbonate-based resin composition, comprising: a polycarbonate-based resin (A) containing at least one of a branched polycarbonate-based resin (A-1) and an aromatic polycarbonate-based resin (A-2) except the branched polycarbonate-based resin (A-1); a fluorine-containing compound (B) having such a hydrocarbon structure that all hydrogen atoms of the hydrocarbon structure are substituted with fluorine; and a polyether (C) having a polyoxyalkylene structure, wherein a content of the polyether (C) having a polyoxyalkylene structure is 0.02 part by mass or more and 2.0 parts by mass or less with respect to 100 parts by mass of the polycarbonate-based resin (A), and wherein a mass ratio of the fluorine-containing compound (B) to the polyether (C) is 15.00 or less.

[2] The polycarbonate-based resin composition according to the above-mentioned item [1], wherein the fluorine-containing compound (B) is at least one kind selected from the group consisting of a fluorine-containing compound (B1) having a perfluoroalkylene unit and a fluorine-containing compound (B2) having a perfluoroalkyl group, as such a hydrocarbon structure that all hydrogen atoms of a hydrocarbon are substituted with fluorine.

[3] The polycarbonate-based resin composition according to the above-mentioned item [2], wherein a content of the fluorine-containing compound (B1) having a perfluoroalkylene unit is 0.13 part by mass or less with respect to 100 parts by mass of the polycarbonate-based resin (A).

[4] The polycarbonate-based resin composition according to the above-mentioned item [2] or [3], wherein the fluorine-containing compound (B1) having a perfluoroalkylene unit is a polytetrafluoroethylene.

[5] The polycarbonate-based resin composition according to the above-mentioned item [4], wherein the polytetrafluoroethylene is an aqueous dispersion-type or acryl-coated polytetrafluoroethylene.

[6] The polycarbonate-based resin composition according to the above-mentioned item [2], wherein the fluorine-containing compound (B2) having a perfluoroalkyl group is a perfluoroalkylsulfonic acid metal salt.

[7] The polycarbonate-based resin composition according to the above-mentioned item [6], wherein the perfluoroalkylsulfonic acid metal salt is potassium nonafluorobutanesulfonate.

[8] The polycarbonate-based resin composition according to any one of the above-mentioned items [1] to [6], wherein the fluorine-containing compound (B) has an average particle diameter of 0.05 µm or more and 1.0 µm or less.

[9] The polycarbonate-based resin composition according to any one of the above-mentioned items [1] to [8], wherein the polyether (C) has a number-average molecular weight of 200 or more and 10,000 or less.

[10] The polycarbonate-based resin composition according to any one of the above-mentioned items [1] to [9], wherein a content of the branched polycarbonate-based resin (A-1) in the polycarbonate-based resin (A) is more than 0 mass %, and
wherein a branching ratio in the polycarbonate-based resin (A) is 0.01 mol % or more and 3.0 mol % or less.

[11] The polycarbonate-based resin composition according to the above-mentioned item [10], wherein a product of a content of a fluorine-containing compound (B1) having a perfluoroalkylene unit with respect to 100 parts by mass of the polycarbonate-based resin (A) and the branching ratio in the polycarbonate-based resin (A) is 0.030 or more.

[12] The polycarbonate-based resin composition according to any one of the above-mentioned items [1] to [11], wherein the content of the polyether (C) is 0.6 part by mass or less with respect to 100 parts by mass of the polycarbonate-based resin (A).

[13] The polycarbonate-based resin composition according to any one of the above-mentioned items [1] to [12], wherein the polyether (C) is at least one kind selected from the group consisting of polyethylene glycol, polypropylene glycol, polyoxytrimethylene glycol, polyoxytetramethylene glycol, polyoxyethylene glycol-polyoxypropylene glycol, polyoxytetramethylene glycol-polyoxypropylene glycol, and polyoxytetramethylene glycol-polyoxyethylene glycol.

[14] The polycarbonate-based resin composition according to any one of the above-mentioned items [1] to [13], further comprising a flame retardant.

[15] The polycarbonate-based resin composition according to any one of the above-mentioned items [1] to [14], further comprising an antioxidant.

[16] The polycarbonate-based resin composition according to any one of the above-mentioned items [1] to [15], further comprising a UV absorber.

[17] The polycarbonate-based resin composition according to any one of the above-mentioned items [1] to [16], further comprising a light diffuser.

[18] The polycarbonate-based resin composition according to any one of the above-mentioned items [1] to [17], wherein a total light transmittance of a 3-millimeter thick portion measured by the following method A is 70% or more:

Method A: a test piece that is a three-stage plate measuring 90 mm×50 mm, including the 3-millimeter thick portion measuring 45 mm×50 mm, a 2-millimeter thick portion measuring 22.5 mm×50 mm, and a 1-millimeter thick portion measuring 22.5 mm×50 mm, is produced using a pellet obtained from the polycarbonate-based resin composition by an injection molding method at a molding temperature of 310° C. and a mold temperature of 95° C., and is subjected to measurement of the total light transmittance in conformity with JIS K 7375:2008.

[19] The polycarbonate-based resin composition according to the above-mentioned item [18], wherein a ratio between the total light transmittance of the 3-millimeter thick portion and a total light transmittance of the 1-millimeter thick portion (total light transmittance at a thickness of 3 mm/total light transmittance at a thickness of 1 mm), which are measured by the method A, is 0.70 or more.

[20] The polycarbonate-based resin composition according to any one of the above-mentioned items [1] to [19], wherein, when the polycarbonate-based resin composition is molded to have a thickness of 1.0 mm, a result corresponding to any one of V-2, V-1, or V-0 is obtained under a UL94 standard.

[21] A molded article, comprising the polycarbonate-based resin composition of any one of the above-mentioned items [1] to [20]

Advantageous Effects of Invention

The molded article formed of the polycarbonate-based resin composition of the present invention is excellent in transparency. Further, the molded article can be excellent in both of transparency and flame retardancy, in particular, thin-wall flame retardancy. The molded article is suitable as various optical molded articles, for example, lighting equipment diffusion covers each made of a resin, such as a lighting cover and a display cover, and a lens.

DESCRIPTION OF EMBODIMENTS

A polycarbonate-based resin composition of the present invention includes: a polycarbonate-based resin (A) containing at least one of a branched polycarbonate-based resin (A-1) and an aromatic polycarbonate-based resin (A-2) except the branched polycarbonate-based resin (A-1); a fluorine-containing compound (B) having such a hydrocarbon structure that all hydrogen atoms of the hydrocarbon structure are substituted with fluorine; and a polyether (C) having a polyoxyalkylene structure, wherein a content of the polyether (C) having a polyoxyalkylene structure is 0.02 part by mass or more and 2.0 parts by mass or less with respect to 100 parts by mass of the polycarbonate-based resin (A), and wherein a mass ratio of the fluorine-containing compound (B) to the polyether (C) is 15.00 or less.

The polycarbonate-based resin composition, and a molded article thereof, of the present invention are described in detail below. In this description, a specification considered to be preferred may be arbitrarily adopted, and it can be said that a combination of preferred specifications is more preferred. The term "XX to YY" as used herein means "XX or more and YY or less."

[Polycarbonate-Based Resin (A)]

The polycarbonate-based resin composition of the present invention includes the polycarbonate-based resin (A) containing at least one of the branched polycarbonate-based resin (A-1) and the aromatic polycarbonate-based resin (A-2) except the resin (A-1).

<Branched Polycarbonate-Based Resin (A-1)>

The branched polycarbonate-based resin (A-1) is not particularly limited as long as the branched polycarbonate-based resin (A-1) is a polycarbonate-based resin having a branched structure. An example thereof may be a polycarbonate-based resin having a repeating unit represented by the following general formula (I) and having a branched structure represented by the following general formula (II):

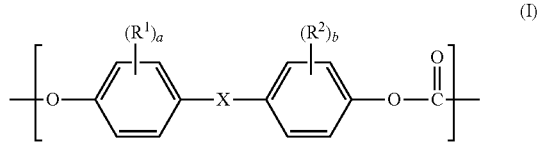

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "a" and "b" each independently represent an integer of from 0 to 4;

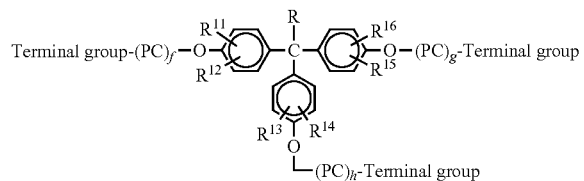

wherein R represents a hydrogen atom or an alkyl group having 1 to 5 carbon atoms, $R^{11}$ to $R^{16}$ each independently represent a hydrogen atom, an alkyl group having 1 to 5 carbon atoms, or a halogen atom, PC represents a polycarbonate moiety, and "f", "g", and "h" each represent an integer.

In the general formula (I), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred.

"a" and "b" each independently represent an integer of from 0 to 4, preferably from 0 to 2, more preferably 0 or 1. Among them, a repeating unit in which "a" and "b" each represent 0, and X represents a single bond or an alkylene group having 1 to 8 carbon atoms, or a repeating unit in which "a" and "b" each represent 0, and X represents an alkylene group having 3 carbon atoms, in particular, an isopropylidene group is suitable.

The branched structure is described. The polycarbonate moiety represented by PC in the formula (II) has a repeating unit represented by the above-mentioned general formula (I), for example, a repeating unit derived from bisphenol A that is represented by the following formula (III). A branching agent and a raw material dihydric phenol to be used at the time of the production of the branched polycarbonate-based resin (A-1) are described later.

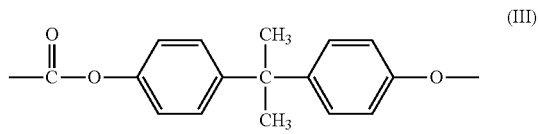

It is preferred that the branched polycarbonate-based resin (A-1) have the branched structure represented by the general formula (II), and have a branching ratio of 0.01 mol % or more and 3.0 mol % or less. When the branching ratio of the branched polycarbonate-based resin (A-1) falls within the range, the flame retardancy of the polycarbonate-based resin composition of the present invention can be further improved, and the polycarbonate is easy to produce because gelation hardly occurs during its polymerization. The branching ratio of the branched polycarbonate-based resin (A-1) means the ratio of the number of moles of a structural unit derived from the branching agent to the total number of moles of a structural unit derived from the dihydric phenol, the structural unit derived from the branching agent being used in the production of the branched polycarbonate-based resin (A-1), and a terminal unit (number of moles of structural unit derived from branching agent/total number of moles of (structural unit derived from dihydric phenol+structural unit derived from branching agent+terminal unit)× 100 (represented in the unit of mol %)). The branching ratio may be actually measured by $^1$H-NMR measurement.

When the branching agent to be described later is added at 0.01 mol % or more and 3.0 mol % or less with respect to the total number of moles of the dihydric phenol compound, the branching agent, and a terminal stopper, which are raw materials for the branched polycarbonate-based resin (A-1), at the time of the production of the polycarbonate-based resin, a branched polycarbonate-based resin having a branching ratio in the above-mentioned range can be obtained.

From the viewpoint of obtaining more excellent flame retardancy, the branching ratio of the branched polycarbonate-based resin (A-1) is more preferably 0.3 mol % or more, still more preferably 0.4 mol % or more, still further more preferably 0.7 mol % or more, still further more preferably 0.9 mol % or more, still further more preferably 1.0 mol % or more, still further more preferably 1.4 mol % or more, particularly preferably 1.5 mol % or more. From the viewpoint of obtaining more satisfactory physical properties, the branching ratio of the branched polycarbonate-based resin (A-1) is more preferably 2.8 mol % or less, still more preferably 2.6 mol % or less, still further more preferably 2.3 mol % or less, still further more preferably 2.0 mol % or less. The branched structure may be derived from a single branching agent, or may be derived from two or more of branching agents. The branched structure represented by the general formula (II) more preferably has a branched structure that is a structure derived from 1,1,1-tris(4-hydroxyphenyl)ethane among such branching agents.

The branched polycarbonate-based resin (A-1) has a viscosity-average molecular weight (Mv) of preferably from 10,000 to 50,000, more preferably from 15,000 to 30,000, still more preferably from 17,000 to 28,000. The viscosity-average molecular weight may be adjusted by using, for example, a molecular weight modifier (terminal stopper), or in accordance with a reaction condition. When the viscosity-average molecular weight of the branched polycarbonate-based resin (A-1) falls within the ranges, a polycarbonate-based resin composition excellent in flame retardancy and also excellent in moldability can be obtained.

The viscosity-average molecular weight (Mv) is a value calculated from the following Schnell's equation by measuring the limiting viscosity [η] of a methylene chloride solution at 20° C.

$$[\eta]=1.23\times 10^{-5}\times Mv^{0.83}$$

<Aromatic Polycarbonate-Based Resin (A-2)>

The aromatic polycarbonate-based resin (A-2) is an unbranched polycarbonate-based resin except the branched polycarbonate-based resin (A-1), and preferably has a repeating unit represented by the following general formula (IV):

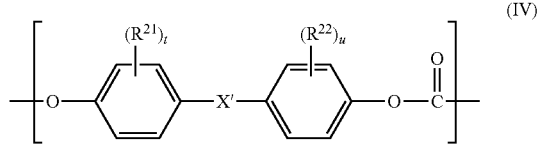

wherein $R^{21}$ and $R^{22}$ each independently represent a halogen atom, an alkyl group having 1 to 6 carbon atoms, or an alkoxy group having 1 to 6 carbon atoms, X' represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "t" and "u" each independently represent an integer of from 0 to 4.

Specific examples of the halogen atom, the alkyl group having 1 to 6 carbon atoms, or the alkoxy group having 1 to 6 carbon atoms represented by each of $R^{21}$ and $R^{22}$ in the formula (IV) are the same as those described above for $R^1$ and $R^2$. Specific examples of the alkylene group having 1 to 8 carbon atoms, the alkylidene group having 2 to 8 carbon atoms, the cycloalkylene group having 5 to 15 carbon atoms, or the cycloalkylidene group having 5 to 15 carbon atoms represented by X' are the same as those described above for X. "t" and "u" each independently represent an integer of from 0 to 4, preferably from 0 to 2, more preferably 0 or 1.

Among such resins, a resin in which "t" and "u" each represent 0, and X' represents a single bond or an alkylene group having 1 to 8 carbon atoms, or a resin in which "t" and "u" each represent 0, and X' represents an alkylidene group, in particular, an isopropylidene group is suitable. The polycarbonate-based resin of the present invention may include a plurality of kinds of polycarbonate blocks as the aromatic polycarbonate-based resins (A-2).

When the polycarbonate-based resin includes the plurality of kinds of polycarbonate blocks as the aromatic polycarbonate-based resins (A-2), the content of a resin in which "t" and "u" each represent 0, and X' represents an isopropylidene group is preferably 90 mass % or more, more preferably 90.9 mass % or more, still more preferably 93.3 mass % or more, particularly preferably 95 mass % or more, most preferably 100 mass % from the viewpoint of the transparency of the polycarbonate-based resin.

The viscosity-average molecular weight (Mv) of the aromatic polycarbonate resin (A-2) is typically from 10,000 to 50,000, preferably from 13,000 to 35,000, more preferably from 14,000 to 28,000.

The viscosity-average molecular weight (Mv) was calculated from Schnell's equation as with the branched polycarbonate-based resin (A-1).

<Polycarbonate-Based Resin (A)>

The polycarbonate-based resin (A) in the polycarbonate-based resin composition of the present invention contains at least one of the branched polycarbonate-based resin (A-1) and the aromatic polycarbonate-based resin (A-2) except the resin (A-1), and the content of the branched polycarbonate-based resin (A-1) is preferably more than 0 mass % from the viewpoint of obtaining high flame retardancy. The content of the branched polycarbonate-based resin (A-1) is more preferably 55 mass % or more, still more preferably 60 mass % or more, still further more preferably 65 mass % or more, particularly preferably 70 mass % or more, and may be 100 mass %. The content of the aromatic polycarbonate-based resin (A-2) is the balance excluding the branched polycarbonate-based resin (A-1)

A branching ratio in the polycarbonate-based resin (A) is preferably 0.01 mol % or more and 3.0 mol % or less. The branching ratio is more preferably 0.3 mol % or more, still more preferably 0.5 mol % or more, still more preferably 0.7 mol % or more, still further more preferably 1.0 mol % or more, still further more preferably 1.4 mol % or more, still further more preferably 1.5 mol % or more, and is more preferably 2.8 mol % or less, still more preferably 2.6 mol % or less, still further more preferably 2.3 mol % or less, still further more preferably 2.0 mol % or less. When the branching ratio in the polycarbonate-based resin (A) falls within the ranges, a polycarbonate-based resin composition excellent in flame retardancy, specifically excellent in thin-wall flame retardancy is obtained.

The branching ratio of the polycarbonate-based resin (A) means the ratio of the number of moles of a structural unit derived from the branching agent to the total number of moles of a structural unit derived from the dihydric phenol, the structural unit derived from the branching agent being used in the production of the branched polycarbonate-based resin (A-1) and the aromatic polycarbonate-based resin (A-2) except the resin (A-1), and a terminal unit (number of moles of structural unit derived from branching agent/total number of moles of (structural unit derived from dihydric phenol+structural unit derived from branching agent+terminal unit)×100 (represented in the unit of mol %)). The branching ratio may be actually measured by $^1$H-NMR measurement.

The viscosity-average molecular weight of the polycarbonate-based resin (A) is preferably from 10,000 to 50,000, more preferably from 13,000 to 35,000, still more preferably from 15,000 to 30,000, still further more preferably from 17,000 to 28,000, still further more preferably from 22,000 to 26,000. When the viscosity-average molecular weight of the polycarbonate-based resin (A) falls within the ranges, excellent flame retardancy and excellent moldability can be obtained. The viscosity-average molecular weight was calculated from Schnell's equation as with the branched polycarbonate-based resin (A-1).

<Method of Producing Polycarbonate-Based Resin (A)>

The branched polycarbonate-based resin (A-1) and the aromatic polycarbonate-based resin (A-2), which form the polycarbonate-based resin (A), may each be produced through a step (1) of causing a dihydric phenol and phosgene to react with each other in an organic solvent to produce a polycarbonate oligomer, and a subsequent step (2) of causing the polycarbonate oligomer, a dihydric phenol, and a terminal stopper to react with each other to produce the polycarbonate-based resin.

<Step (1)>

In this step, the dihydric phenol and phosgene are caused to react with each other in the organic solvent to produce the polycarbonate oligomer having a chloroformate group.

It is preferred to use, as the dihydric phenol, a compound represented by the following general formula (i) in the case of the branched polycarbonate-based resin (A-1), or a compound represented by the following general formula (ii) in the case of the aromatic polycarbonate-based resin (A-2);

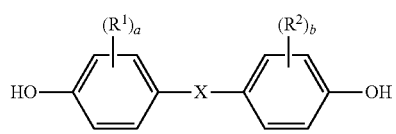

(i)

wherein $R^1$, $R^2$, "a", "b", and X are as described above;

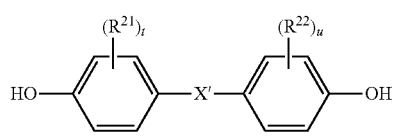

(ii)

wherein $R^{21}$, $R^{22}$, "t", "u", and X' are as described above.

Examples of the dihydric phenol represented by each of the general formulae (i) and (ii) include: bis(hydroxyphenyl) alkane-based dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis (4-hydroxyphenyl) oxide; bis(4-hydroxyphenyl) sulfide; bis (4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, there is obtained a branched polycarbonate-based resin (A-1) in which, in the general formula (I), X represents an isopropylidene group and a=b=0, or an aromatic polycarbonate-based resin (A-2) in which, in the general formula (II), X' represents an isopropylidene group and t=u=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl) propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)] bisphenol, 10,10-bis(4-hydroxyphenyl)-9-anthrone, and 1,5-bis(4-hydroxyphenylthio)-2,3-dioxapentane.

Phosgene is a compound that is typically obtained by causing chlorine and carbon monoxide to react with each other at the following ratio through use of activated carbon as a catalyst: 1.01 mol to 1.3 mol of carbon monoxide is used with respect to 1 mol of chlorine. When phosgene to be used is used as a phosgene gas, a phosgene gas containing about 1 vol % to about 30 vol % of unreacted carbon monoxide may be used. Phosgene in a liquefied state may also be used.

To produce the polycarbonate oligomer in the step (1), an aqueous alkali solution of the dihydric phenol, phosgene, and the organic solvent are introduced into a reactor, and the dihydric phenol and phosgene are caused to react with each other. The usage amount of the organic solvent is desirably selected so that a volume ratio between an organic solvent phase and an aqueous phase may be from 5/1 to 1/7, preferably from 2/1 to 1/4. In the reactor, heat is generated by a reaction in which a terminal group of the dihydric phenol is turned into a chloroformate by phosgene, and a reaction in which phosgene is decomposed by an alkali, and hence the temperature of a reaction product increases. Therefore, the reaction product is preferably cooled so that its temperature may be from 0° C. to 50° C., more preferably from 5° C. to 40° C. Phosgene is preferably used so that the usage amount of phosgene may be from 1.1 mol to 1.5 mol with respect to 1 mol of the dihydric phenol, that is, may be excess. A reaction liquid obtained after the reaction is separated into an aqueous phase and an organic phase. Thus, the organic phase containing the polycarbonate oligomer is obtained. The weight-average molecular weight of the resultant polycarbonate oligomer is typically 5,000 or less, and the degree of polymerization thereof is typically 20 or less, preferably from 2 to 10.

At the time of the production of the polycarbonate oligomer, the amine-based polymerization catalyst to be used in the subsequent step (2) may be used for accelerating the reaction. A terminal stopper to be used as a molecular weight modifier for a polycarbonate may be used. Examples of a compound to be used as the terminal terminator may include monohydric phenols, such as phenol, p-cresol, p-tert-butylphenol, p-tert-octylphenol, p-cumylphenol, 3-pentadecylphenol, bromophenol, tribromophenol, and nonylphenol. Among them, p-tert-butylphenol, p-cumylphenol, and phenol are preferred in terms of, for example, economical efficiency and ease of availability. In addition, the use of 3-pentadecylphenol can largely improve the fluidity of the polycarbonate oligomer to be obtained.

The reactor to be used at the time of the production of the polycarbonate oligomer is preferably a stationary mixer, that is, a static mixer. The stationary mixer is preferably a tubular reactor including, in itself, an element having an action of dividing, turning, and reversing a fluid. When a vessel-type stirring vessel including a stirring machine is further used after the stationary mixer, oligomerization can be accelerated. Accordingly, such reactors are preferably used in combination.

A reaction mixed liquid containing the polycarbonate oligomer having a chloroformate group is obtained through the step (1). The reaction mixed liquid is separated into an organic phase containing the polycarbonate oligomer and an aqueous phase by using a separation method, such as settling, and the organic phase containing polycarbonate oligomer is used in the step (2) to be described later.

<Step (2)>

In the step (2), the polycarbonate oligomer obtained in the step (1), the dihydric phenol, and the terminal stopper are caused to react with each other to produce the polycarbonate-based resin. The polycarbonate oligomer and the dihydric phenol are subjected to a polycondensation reaction so that the molecular weight of a reaction product may be adjusted within a target molecular weight range. The polycondensation reaction is performed until the viscosity-average molecular weight of the polycarbonate-based resin to be obtained falls within the above-mentioned range.

Specifically, the organic solvent phase containing the polycarbonate oligomer that has been separated in the step (1), the terminal stopper to be used if desired, the polymerization catalyst to be used if desired, an organic solvent, an aqueous alkali solution, and an aqueous alkali solution of the dihydric phenol are mixed, and the mixture is subjected to interfacial polycondensation at a temperature in the range of typically from 0° C. to 50° C., preferably from 20° C. to 40° C.

Examples of the alkali of each of the aqueous alkali solutions, the organic solvent, and the terminal stopper to be used in this step may include the same examples as those described for the step (1). The usage amount of the organic solvent in the step (2) is typically selected so that a volume ratio between the organic phase and aqueous phase of a reaction liquid to be obtained may be preferably from 7/1 to 1/1, more preferably from 5/1 to 2/1.

With regard to a reactor to be used in the step (2), the reaction can be completed with only one reactor depending on the processing capacity of the reactor. However, a plurality of reactors such as a second reactor and a third reactor subsequent to the first reactor may be used as required. For example, a stirring vessel, a multistage column-type stirring vessel, a non-stirring vessel, a static mixer, a line mixer, an orifice mixer, and/or piping may be used as any such reactor.

The resultant reaction liquid is subjected to oil-water separation because the reaction liquid includes the organic solvent phase containing the polycarbonate-based resin and the aqueous phase containing an unreacted dihydric phenol. An apparatus for the separation may be, for example, a settling vessel or a centrifugal separator. The separated organic solvent phase containing the polycarbonate-based resin is subjected to alkali washing, acid washing, and pure water washing in the stated order to provide an organic solvent phase containing the purified polycarbonate-based resin. The organic solvent phase containing the purified polycarbonate-based resin is concentrated as required, and is then subjected to a kneader treatment, warm water granulation, or the like. Thus, the powder of the polycarbonate-based resin can be obtained. The organic solvent remains in the resultant powder of the polycarbonate-based resin, and hence the performance of a drying treatment, such as a heating treatment, can provide polycarbonate-based resin powder from which the organic solvent has been removed. The resultant polycarbonate-based resin powder may be pelletized with a pelletizer or the like to provide various molded articles.

<Branching Agent>

The branched polycarbonate-based resin (A-1) can be produced by adding an arbitrary branching agent. The aromatic polycarbonate-based resin (A-2) can be produced by adding no branching agent. The branching agent may be added in the step (1) and/or the step (2). When the branching agent is added in the step (1), the branching agent is added together with the dihydric phenol and phosgene, and the materials are caused to react with each other. A branching agent represented by the general formula (iii) to be described later can be dissolved in an aqueous alkali solution, and is hence desirably introduced after having been dissolved in the aqueous alkali solution, though whether or not the dissolution should be performed varies depending on the branching agent to be used. In addition, a branching agent that is hardly dissolved in an aqueous alkali solution is desirably introduced after having been dissolved in an organic solvent, such as methylene chloride.

The branching agent may be added in any one of the step (1) and the step (2), or in both of the steps (1) and (2). The branching agent may be further added in the step (2). It is preferred that the branching agent be finally added in an addition amount of 0.01 mol % or more and 3.0 mol % or less with respect to the total number of moles of the dihydric phenol compound, the branching agent, and the terminal stopper that are raw materials in terms of total amount of the branching agent to be added in the step (1) and the step (2). The adoption of the addition amount can provide the branched polycarbonate-based resin (A-1) having the above-mentioned preferred branching ratio. The addition amount of the branching agent with respect to the total number of moles of the dihydric phenol compound, the branching agent, and the terminal stopper is more preferably 0.3 mol % or more, still more preferably 0.4 mol % or more, still further more preferably 0.7 mol % or more, still further more preferably 0.9 mol % or more, still further more preferably 1.0 mol % or more, still further more preferably 1.4 mol % or more, particularly preferably 1.5 mol % or more from the viewpoint of obtaining more excellent flame retardancy, and is preferably 2.8 mol % or less, more preferably 2.6 mol % or less, still more preferably 2.3 mol % or less, still further more preferably 2.0 mol % or less from the viewpoint of obtaining more satisfactory physical properties. The setting of the addition amount of the branching agent within the ranges can provide more excellent flame retardancy.

Specifically, a branching agent represented by the following general formula (iii) is used at the time of the production of the branched polycarbonate-based resin represented by the general formula (I):

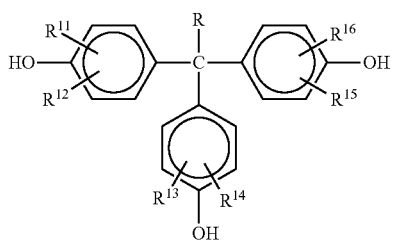

(iii)

wherein R represents a hydrogen atom or an alkyl group having 1 to 5 carbon atoms, and $R^{11}$ to $R^{16}$ each independently represent a hydrogen atom, an alkyl group having 1 to 5 carbon atoms, or a halogen atom.

The branching agent represented by the general formula (iii) is described in more detail.

Examples of the alkyl group having 1 to 5 carbon atoms that is represented by R include a methyl group, an ethyl group, a n-propyl group, a n-butyl group, and a n-pentyl group. Examples of the alkyl group having 1 to 5 carbon atoms that is represented by any one of $R^{11}$ to $R^{16}$ may include a methyl group, an ethyl group, a n-propyl group, a n-butyl group, and a n-pentyl group, and examples of the halogen atom may include a chlorine atom, a bromine atom, and a fluorine atom.

More specific examples of the branching agent represented by the general formula (iii) include compounds each having 3 or more functional groups, such as: 1,1,1-tris(4-hydroxyphenyl)methane; 1,1,1-tris(4-hydroxyphenyl)ethane; 1,1,1-tris(4-hydroxyphenyl)propane; 1,1,1-tris(2-methyl-4-hydroxyphenyl)methane; 1,1,1-tris(2-methyl-4-hydroxyphenyl)ethane; 1,1,1-tris(3-methyl-4-hydroxyphenyl)methane; 1,1,1-tris(3-methyl-4-hydroxyphenyl)ethane; 1,1,1-tris(3,5-dimethyl-4-hydroxyphenyl)methane; 1,1,1-tris(3,5-dimethyl-4-hydroxyphenyl)ethane; 1,1,1-tris(3-chloro-4-hydroxyphenyl)methane; 1,1,1-tris(3-chloro-4-hydroxyphenyl)ethane; 1,1,1-tris(3,5-dichloro-4-hydroxyphenyl)methane; 1,1,1-tris(3,5-dichloro-4-hydroxyphenyl)ethane; 1,1,1-tris(3-bromo-4-hydroxyphenyl)methane; 1,1,1-tris(3-bromo-4-hydroxyphenyl)ethane; 1,1,1-tris(3,5-dibromo-4-hydroxyphenyl)methane; 1,1,1-tris(3,5-dibromo-4-hydroxyphenyl)ethane; 4,4'-[1-[4-[1-(4-hydroxyphenyl)-1-methylethyl]phenyl]ethylidene]bisphenol; α,α',α''-tris(4-hydroxyphenyl)-1,3,5-triisopropylbenzene; 1-[α-methyl-α-(4'-hydroxyphenyl)ethyl]-4-[α',α'-bis(4''-hydroxyphenyl) ethyl]benzene; and phloroglucin, trimellitic acid, and isatinbis(o-cresol). Among those described above, 1,1,1-tris (4-hydroxyphenyl)ethane (hereinafter sometimes abbreviated as "THPE") is preferably used from the viewpoints of availability, reactivity, and economical efficiency.

<Polymerization Catalyst>

The polymerization catalyst may be used in any of the step (1) and the step (2), and, for example, the amine-based catalyst may be used.

As the amine-based catalyst, a tertiary amine or a salt thereof, or a quaternary ammonium salt may be used. Examples of the tertiary amine include triethylamine, tributylamine, N,N-dimethylcyclohexylamine, pyridine, and dimethylaniline, and examples of the tertiary amine salt include hydrochloric acid salts and bromic acid salts of those tertiary amines. Examples of the quaternary ammonium salt may include trimethylbenzylammonium chloride, triethylbenzylammonium chloride, tributylbenzylammonium chloride, trioctylmethylammonium chloride, tetrabutylammonium chloride, and tetrabutylammonium bromide. As the amine-based catalyst, a tertiary amine is preferred, and triethylamine is particularly suitable. Each of those catalysts may be introduced as it is when the catalyst is in a liquid state or after having been dissolved in an organic solvent or water. In addition, a catalyst in a solid state may be introduced after having been dissolved in an organic solvent or water.

When the polymerization catalyst is used in the step (2), the catalyst is used at a molar ratio of typically 0.0005 or more and 0.030 or less with respect to a chloroformate group of the polycarbonate oligomer obtained in the step (1). When the amount of the polymerization catalyst to be added in the step (2) falls within the range, the flame retardancy of the polycarbonate-based resin to be obtained can be improved.

The amount of the polymerization catalyst to be added in the step (2) is more preferably 0.001 or more, still more preferably 0.002 or more, still more preferably 0.004 or more, still more preferably 0.006 or more in terms of molar ratio with respect to a chloroformate group of the polycarbonate oligomer, and is more preferably 0.025 or less, still more preferably 0.020 or less.

[Fluorine-Containing Compound (B)]

The polycarbonate-based resin composition of the present invention includes the fluorine-containing compound (B). The fluorine-containing compound is a fluorine-containing compound having such a hydrocarbon structure that all hydrogen atoms of the hydrocarbon structure are substituted with fluorine. At least one kind selected from the group consisting of a fluorine-containing compound (B1) having a perfluoroalkylene unit and a fluorine-containing compound (B2) having a perfluoroalkyl group is preferably used as the fluorine-containing compound (B). The incorporation of the fluorine-containing compound (B) can further improve the flame retardancy of the polycarbonate-based resin composition.

<Fluorine-Containing Compound (B1)>

The fluorine-containing compound (B1) has a perfluoroalkylene unit as such a hydrocarbon structure that all hydrogen atoms of a hydrocarbon are substituted with fluorine. An example of such fluorine-containing compound (B1) may be a fluorine-containing polymer having a fibril-forming ability, and examples thereof may include a polytetrafluoroethylene and a tetrafluoroethylene-based copolymer (e.g., a tetrafluoroethylene/hexafluoropropylene copolymer). Among them, a polytetrafluoroethylene (hereinafter sometimes referred to as PTFE) is preferred. The fluorine-containing compounds (B1) may be used alone or in combination thereof.

The polytetrafluoroethylene is not particularly limited, and a known polytetrafluoroethylene may be used. However, an aqueous dispersion-type polytetrafluoroethylene or an acryl-coated polytetrafluoroethylene is preferred. The use of the aqueous dispersion-type or acryl-coated polytetrafluoroethylene can suppress an appearance failure. For example, when a certain amount of a powdery polytetrafluoroethylene is used, there is a risk in that the polytetrafluoroethylene aggregates to form an aggregate, and the aggregate impairs the appearance of the molded article. Examples of the aqueous dispersion-type or acryl-coated polytetrafluoroethylene include "METABLEN A" series typified by "METABLEN A3000" (product name), "METABLEN A3750" (product name), and "METABLEN A3800" (product name) manufactured by Mitsubishi Chemical Corporation, "SN3705" (product name) manufactured by Shine Polymer, "BLENDEX B449" (product name) manufactured by GE Specialty Chemicals, "POLYFLON PTFE D-210C" (product name) manufactured by Daikin Industries, Ltd., and "Fluon PTFE AD" series typified by "Fluon PTFE AD939E" (product name) manufactured by AGC Inc.

<Fluorine-Containing Compound (B2)>

The fluorine-containing compound (B2) is a fluorine-containing compound having a perfluoroalkyl group as such a hydrocarbon structure that all hydrogen atoms of a hydrocarbon are substituted with fluorine. An example of the fluorine-containing compound (B2) may be a fluorine-containing organometallic salt compound. The fluorine-containing organometallic salt compound is a metal salt compound formed of: an anion component formed of an organic acid having a perfluoroalkyl group; and a cation component formed of a metal ion. More suitable specific examples thereof may include a metal salt of a sulfonic acid having a perfluoroalkyl group, a metal salt of a sulfuric acid ester having a perfluoroalkyl group, and a metal salt of a phosphoric acid ester having a perfluoroalkyl group. The fluorine-containing compound (B2) is preferably a perfluoroalkylsulfonic acid metal salt. The fluorine-containing compounds (B2) may be used alone or in combination thereof.

When the fluorine-containing compound (B2) is a fluorine-containing organometallic salt compound, a metal for forming its metal ion is preferably an alkali metal or an alkaline earth metal. Examples of the alkali metal include lithium, sodium, potassium, rubidium, and cesium. Examples of the alkaline earth metal include beryllium, magnesium, calcium, strontium, and barium. Among them, an alkali metal is more suitable. Among the alkali metals, rubidium and cesium are suitable when higher transparency is required.

However, rubidium and cesium are not versatile and are also difficult to purify, and as a result, are disadvantageous in terms of cost in some cases. Meanwhile, conversely, lithium and sodium are advantageous in terms of cost and flame retardancy, but are disadvantageous in terms of transparency in some cases. Different alkali metals in perfluoroalkylsulfonic acid alkali metal salts may be used in accordance with the situation, but a perfluoroalkylsulfonic acid potassium salt, which is excellently balanced in every respect, is suitable. Such potassium salt may be used in combination with a perfluoroalkylsulfonic acid alkali metal salt formed of another alkali metal.

Specific examples of the perfluoroalkylsulfonic acid alkali metal salt include potassium trifluoromethanesulfonate, potassium nonafluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium nonafluorobutanesulfonate, lithium perfluoroheptanesulfonate, cesium trifluoromethanesulfonate, cesium nonafluorobutanesulfonate, cesium perfluorooctanesulfonate, cesium perfluorohexanesulfonate, rubidium nonafluorobutanesulfonate, and rubidium perfluorohexanesulfonate. The perfluoroalkylsulfonic acid alkali metal salts may be used alone or in combination thereof. The number of carbon atoms of the perfluoroalkyl group falls within preferably the range of from 1 to 18, more preferably the range of from 1 to 10, still more preferably the range of from 1 to 8. Among them, potassium nonafluorobutanesulfonate is particularly preferred.

The form of the fluorine-containing compound (B) is not particularly limited, but is preferably particulate. The average particle diameter of the fluorine-containing compound (B) is preferably 0.05 µm or more and 1.0 µm or less. When the average particle diameter falls within the range, the fluorine-containing compound (B) can be suppressed from aggregating in the composition, and also be uniformly dispersed in the composition. The average particle diameter of the fluorine-containing compound (B) is more preferably 0.1 µm or more, still more preferably 0.15 µm or more, still further more preferably 0.20 µm or more, and is more preferably 0.50 µm or less, still more preferably 0.40 µm or less, still further more preferably 0.35 µm or less. For example, the average particle diameter corresponds to the particle diameter of the fluorine-containing compound (B1) having a perfluoroalkylene unit, especially polytetrafluoroethylene fine particles.

The average particle diameter of the fluorine-containing compound is specifically measured by an electrophoretic light-scattering method.

The polycarbonate-based resin composition of the present invention includes the fluorine-containing compound (B). In particular, when the composition of the present invention includes the fluorine-containing compound (B1) having a perfluoroalkylene unit, the content thereof is preferably as follows: the compound is included at preferably 0.5 part by mass or less, more preferably 0.3 part by mass or less, still more preferably 0.13 part by mass or less, still further more preferably 0.10 part by mass or less with respect to 100 parts by mass of the polycarbonate-based resin (A). When the content falls within the ranges, dispersibility in the composition is excellent, and hence a reduction in transparency or the like due to the aggregation of particles hardly occurs. Accordingly, excellent transparency can be maintained. In addition, the composition of the present invention preferably includes the fluorine-containing compound (B1) having a perfluoroalkylene unit at preferably 0.01 part by mass or more, more preferably 0.03 part by mass or more, still more preferably 0.05 part by mass or more with respect to 100 parts by mass of the polycarbonate-based resin (A). When the content is set to 0.01 part by mass or more, excellent flame retardancy can be obtained while the transparency is maintained. When the fluorine-containing compound (B1) is an acryl-coated polytetrafluoroethylene or an aqueous dispersion-type polytetrafluoroethylene, the amount of the polytetrafluoroethylene excluding an acryl-coating part or a water part serving as a dispersion medium falls within the ranges.

In the polycarbonate-based resin composition of the present invention, the product of the content of the fluorine-containing compound (B1) having a perfluoroalkylene unit with respect to 100 parts by mass of the polycarbonate-based resin (A) and the branching ratio (mol %) in the polycarbonate-based resin (A) is preferably 0.030 or more. When the product falls within the range, the composition is excellent in balance between high flame retardancy and high transparency. The product is more preferably 0.040 or more, still more preferably 0.050 or more, still further more preferably 0.080 or more, particularly preferably 0.090 or more. In addition, the product is preferably 1.5 or less, more preferably 1.0 or less, still more preferably 0.2 or less, particularly preferably 0.15 or less. The content of the fluorine-containing compound (B1) in the product means, as described above, the substantial amount of the fluorine-containing compound excluding the acryl-coating part or the water part.

In the polycarbonate-based resin composition of the present invention, the content of the fluorine-containing compound (B2) having a perfluoroalkyl group is preferably 0.01 part by mass or more, more preferably 0.03 part by mass or more, still more preferably 0.05 part by mass or more with respect to 100 parts by mass of the polycarbonate-based resin (A), and is preferably 1.0 part by mass or less, more preferably 0.5 part by mass or less, still more preferably 0.2 part by mass or less with respect thereto. When the content of the fluorine-containing compound (B2) falls within the ranges, the flame retardancy can be further improved while a high total light transmittance is maintained.

<Polyether (C) Having Polyoxyalkylene Structure>

The polycarbonate-based resin composition of the present invention includes the polyether (C) having a polyoxyalkylene structure. The polyether (C) having a polyoxyalkylene structure preferably has a polyoxyalkylene structure represented by $(R^{C1}O)_m$ and a polyoxyalkylene structure represented by $(R^{C2}O)_n$. In the formulae, $R^{C1}$ and $R^{C2}$ each independently represent an alkylene group having 1 or more carbon atoms. m+n is 5 or more and less than 300, preferably from 10 to 200, more preferably from 20 to 100.

Examples of the alkylene group represented by each of $R^{C1}$ and $R^{C2}$ include a methylene group, an ethylene group, a trimethylene group, a propylene group, a tetramethylene group, and a hexamethylene group. Among them, an alkylene group having 1 to 5 carbon atoms is preferred.

In the "m" $R^{C1}O$ groups, the plurality of $R^{C1}$ may represent alkylene groups identical to each other, or may represent alkylene groups different from each other in number of carbon atoms. That is, the polyoxyalkylene group represented by $(R^{C1}O)_m$ is not limited to a group having a single oxyalkylene unit as a repeating unit, such as a polyoxyethylene group or a polyoxypropylene group, and may be a group having as repeating units a plurality of oxyalkylene units different from each other in number of carbon atoms, such as an oxyethylene unit and an oxypropylene unit.

$R^{C2}$ is similar to $R^{C1}$, and in the "n" $R^{C2}O$ groups, the plurality of $R^{C2}$ may represent alkylene groups identical to each other, or may represent alkylene groups different from each other in number of carbon atoms.

Among the alkylene groups represented by $R^{C1}$ and $R^{C2}$ described above, in particular, it is preferred from the viewpoint of improving an initial color tone that $R^{C1}$ and $R^{C2}$ each represent an alkylene group selected from an ethylene group, a propylene group, and a tetramethylene group, and that at least one of $R^{C1}$ or $R^{C2}$ represent any one of an ethylene group or a propylene group.

The polyether (C) is preferably at least one kind selected from the group consisting of: a compound (C-1) represented by the following general formula (V); an alkylene oxide adduct of a polyhydric alcohol and an ester thereof (C-2); and a cyclic polyether compound (C-3):

wherein $R^{C1}$ and $R^{C2}$ each independently represent an alkylene group having 1 or more carbon atoms, m+n is 5 or more and less than 300, $R^{C3}$ and $R^{C4}$ each independently represent a hydrogen atom, a hydrocarbon group having 1 to 30 carbon atoms, an alkanoyl group having 1 to 30 carbon atoms, an alkenoyl group having 2 to 30 carbon atoms, or a glycidyl group, and A represents a single bond or a divalent organic group.

The alkylene group represented by each of $R^{C1}$ and $R^{C2}$ is as described above. The polyoxyalkylene structure represented by $(R^{C1}O)_m$ and the polyoxyalkylene structure represented by $(R^{C2}O)_n$ are also as described above.

Examples of the hydrocarbon group having 1 to 30 carbon atoms represented by each of $R^{C3}$ and $R^{C4}$ include an alkyl group having 1 to 30 carbon atoms, an alkenyl group having 2 to 30 carbon atoms, an aryl group having 6 to 30 carbon atoms, and an aralkyl group having 7 to 30 carbon atoms.

The alkyl group and the alkenyl group may be linear, branched, or cyclic, and examples thereof include a methyl group, an ethyl group, a n-propyl group, an isopropyl group, various butyl groups, various pentyl groups, various hexyl groups, various octyl groups, a cyclopentyl group, a cyclohexyl group, an allyl group, a propenyl group, various butenyl groups, various hexenyl groups, various octenyl groups, a cyclopentenyl group, and a cyclohexenyl group. Examples of the aryl group include a phenyl group, a tolyl group, and a xylyl group. Examples of the aralkyl group include a benzyl group, a phenethyl group, and a methyl benzyl group.

The alkanoyl group having 1 to 30 carbon atoms that is represented by each of BP and $R^{C4}$ may be linear or branched, and examples thereof include a methanoyl group, an ethanoyl group, a n-propanoyl group, an isopropanoyl group, a n-butanoyl group, a tert-butanoyl group, a n-hexanoyl group, a n-octanoyl group, a n-decanoyl group, a n-dodecanoyl group, and a benzoyl group. Among them, an alkanoyl group having 1 to 20 carbon atoms is preferred from the viewpoints of compatibility, thermal stability, and ease of production.

The alkenoyl group having 2 to 30 carbon atoms that is represented by each of BP and $R^{C4}$ may be linear or branched, and examples thereof include an ethenoyl group, a n-propenoyl group, an isopropenoyl group, a n-butenoyl group, a tert-butenoyl group, a n-hexenoyl group, a n-octenoyl group, a n-decenoyl group, and a n-dodecenoyl group. Among them, from the viewpoint of reducing the molecular weight, the viewpoint of compatibility or solubility, and the viewpoint of ease of production, an alkenoyl group having 2 to 10 carbon atoms is preferred, and an alkenoyl group having 2 to 6 carbon atoms is more preferred.

An example of the divalent organic group represented by A is a group represented by the following formula (a).

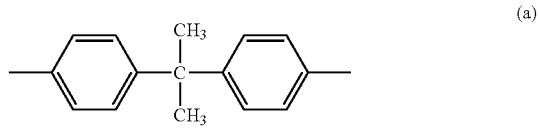

Specific examples of the compound (C-1) represented by the general formula (V) include polyethylene glycol, polypropylene glycol, polytetramethylene glycol, polyoxytetramethylene polyoxyethylene glycol, polyoxyethylene polyoxypropylene glycol, polyoxyethylene monomethyl ether, polyoxyethylene dimethyl ether, polyoxyethylene-bisphenol A ether, polyoxypropylene-bisphenol A ether, polyoxyethylene-polyoxypropylene-bisphenol A ether, polyethylene glycol-allyl ether, polyethylene glycol-diallyl ether, polypropylene glycol-allyl ether, polypropylene glycol-diallyl ether, polyethylene glycol-polypropylene glycol-allyl ether, polyethylene glycol dimethacrylate, polypropylene glycol dimethacrylate, and polypropylene glycol distearate. Those compounds are commercial products, and, for example, "UNIOX (trademark)", "UNIOL (trademark)", "UNILUBE (trademark)", "UNISAFE (trademark)", "POLYCERIN (trademark)", or "EPIOL (trademark)" manufactured by NOF Corporation may be used.

Examples of the polyhydric alcohol in the alkylene oxide adduct of a polyhydric alcohol and the ester thereof (C-2) include glycerin, diglyceryl ether, and sorbitol.

Specific examples of the cyclic polyether compound (C-3) include 18-crown-6 and dibenzo-18-crown-6.

As the polyether (C), at least one kind selected from the group consisting of polyethylene glycol, polypropylene glycol, polyoxytrimethylene glycol, polyoxytetramethylene glycol, polyoxyethylene glycol-polyoxypropylene glycol, polyoxytetramethylene glycol-polyoxypropylene glycol, and polyoxytetramethylene glycol-polyoxyethylene glycol is preferably used.

The number-average molecular weight of the polyether (C) is not particularly limited, but is preferably from 200 to 10,000, more preferably from 500 to 8,000, still more preferably from 1,000 to 5,000. When the number-average molecular weight of the polyether (C) falls within the ranges, its compatibility with the polycarbonate-based resin (A) is good, and hence a high total light transmittance can be maintained.

The content of the polyether (C) is 0.02 part by mass or more and 2.0 parts by mass or less with respect to 100 parts by mass of the polycarbonate-based resin (A). A case in which the content of the polyether (C) is less than 0.02 part by mass is not preferred because the transparency of a molded article of the polycarbonate-based resin composition is reduced, and hence an adverse influence is exhibited in the case of an optical molded article application. A case in which the content of the polyether (C) is more than 2.0 parts by mass is not preferred because the flame retardancy of the polycarbonate-based resin composition is reduced. The content of the polyether (C) is preferably 0.05 part by mass or more, more preferably 0.10 part by mass or more, still more preferably 0.15 part by mass or more with respect to 100 parts by mass of the polycarbonate-based resin (A), and is preferably 1.50 parts by mass or less, more preferably 1.2 parts by mass or less, still more preferably 0.9 part by mass or less, still further more preferably 0.6 part by mass or less with respect thereto.

The above-mentioned polyethers may be used alone or in combination thereof. When the composition includes a plurality of kinds of polyethers, their total amount falls within the ranges.

In the polycarbonate-based resin composition of the present invention, the mass ratio of the fluorine-containing compound (B) to the polyether (C) is 15.00 or less. When the mass ratio of the fluorine-containing compound (B) to the polyether (C) falls within the ranges, the transparency of the polycarbonate-based resin composition becomes more excellent. Although the reason is not clear, one possible reason for the improvement in transparency is that, when the above-mentioned mass ratio is satisfied, the aggregation of the fluorine-containing compound (B) is suppressed. A case in which the mass ratio of the fluorine-containing compound (B) to the polyether (C) is more than 15.00 is not preferred because the amount of the fluorine-containing compound (B) is large with respect to the amount of the polyether (C), leading to a reduction in total light transmittance. The mass ratio of the fluorine-containing compound (B) to the polyether (C) is preferably 3.00 or less, more preferably 2.50 or less, still more preferably 2.00 or less.

In addition, when the composition does not include the branched polycarbonate-based resin (A-1), the mass ratio of the fluorine-containing compound (B) to the polyether (C) is preferably 1.00 or more. When this range is satisfied, the aggregation of the fluorine-containing compound (B) can be suppressed, and at the same time, excellent flame retardancy can be obtained.

<Other Additives>

The polycarbonate resin composition of the present invention may include various additives in addition to the above-mentioned components (A) to (C) to such an extent that its transparency, color tone, and flame retardancy are not adversely influenced. Examples of those additives may include a flame retardant, an antioxidant, a UV absorber, and a light diffuser.

The flame retardant is not particularly limited, and a known flame retardant may be used. Specific examples thereof may include an organic alkali metal salt and an organic alkaline earth metal salt, and a polyorganosiloxane-based compound. In the present invention, the flame retardant does not include compounds included in the scope of the fluorine-containing compound (B), specifically the perfluoroalkylsulfonic acid metal salt and the like. Those salts may be used alone or in combination thereof. The flame retardant is preferably any one of the organic alkali metal salt and the organic alkaline earth metal salt.

An example of the organic sulfonic acid salt of the alkali metal or alkaline earth metal (hereinafter sometimes collectively referred to as "alkali(ne earth) metal") is a metal salt of an aromatic sulfonic acid and an alkali metal or an alkaline earth metal.

Examples of the alkali metal include lithium, sodium, potassium, rubidium, and cesium. Examples of the alkaline earth metal include beryllium, magnesium, calcium, strontium, and barium. Among them, an alkali metal is more preferred.

Among those alkali metals, potassium and sodium are preferred, and potassium is particularly preferred from the viewpoints of flame retardancy and thermal stability. A potassium salt and a sulfonic acid alkali metal salt formed of another alkali metal may be used in combination.

Specific examples of the aromatic sulfonic acid alkali(ne earth) metal salt include disodium diphenyl sulfide-4,4'-disulfonate, dipotassium diphenyl sulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecyl phenyl ether disulfonate, polysodium poly(2,6-dimethylphenylene oxide) polysulfonate, polysodium poly(1,3-phenylene oxide) polysulfonate, polysodium poly(1,4-phenylene oxide) polysulfonate, polypotassium poly(2,6-diphenylphenylene oxide) polysulfonate, lithium poly(2-fluoro-6-butylphenylene oxide) polysulfonate, potassium benzenesulfonate, sodium benzenesulfonate, sodium p-toluenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenyl sulfone-3-sulfonate, potassium diphenyl sulfone-3-sulfonate, dipotassium diphenyl sulfone-3,3'-disulfonate, dipotassium diphenyl sulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene- 2,5-disulfonate, calcium thiophene-2,5-disulfonate, sodium benzothiophenesulfonate, potassium diphenyl sulfoxide-4-sulfonate, a formalin condensate of sodium naphthalenesulfonate, and a formalin condensate of sodium anthracenesulfonate. Among those aromatic sulfonic acid alkali(ne earth) metal salts, a sodium salt and a potassium salt are particularly suitable.

The polyorganosiloxane to be used as the flame retardant is not particularly limited, and examples thereof include an alkyl hydrogen silicone and an alkoxy silicone. Examples of the alkyl hydrogen silicone may include methyl hydrogen silicone and ethyl hydrogen silicone, and examples of the alkoxy silicone may include methoxy silicone and ethoxy silicone. Among them, the alkoxysilicone may be particularly preferably used as the polyorganosiloxane.

The alkoxysilicone is specifically a silicone compound containing an alkoxysilyl group in which an alkoxy group is bonded to a silicon atom directly or through a divalent hydrocarbon group. Examples thereof include a linear polyorganosiloxane, a cyclic polyorganosiloxane, a network polyorganosiloxane, and a linear polyorganosiloxane having a partial branch. Among them, the linear polyorganosiloxane is particularly preferred. More specifically, a polyorganosiloxane having such a molecular structure that an alkoxy group is bonded to its silicone main chain through a methylene chain is preferred.

As the polyorganosiloxane to be used as the flame retardant, for example, commercial products such as "SH1107", "SR2402", "BY16-160", "BY16-161", "BY16-160E", and "BY16-161E" manufactured by Dow Corning Toray Co., Ltd., and "KR511" manufactured by Shin-Etsu Chemical Co., Ltd. may be suitably used.

With regard to the blending amount of the flame retardant, the flame retardant is desirably blended in an amount of typically from 0.001 part by mass to 1 part by mass, preferably from 0.01 part by mass to 0.80 part by mass, more preferably from 0.02 part by mass to 0.40 part by mass with respect to 100 parts by mass of the polycarbonate-based resin (A). When the blending amount is 0.001 part by mass or more, sufficient flame retardancy is obtained, and when the blending amount is 1 part by mass or less, the contamination of a mold can be suppressed. The above-mentioned flame retardants may be used alone or in combination thereof. When the composition includes a plurality of kinds of flame retardants, their total amount falls within the ranges.

The polycarbonate-based resin composition of the present invention may include the antioxidant as required. A known antioxidant may be used as the antioxidant, and a phenol-based antioxidant and a phosphorus-based antioxidant may be preferably used. The antioxidants may be used alone or in combination thereof.

Examples of the phenol-based antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis [3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate diethyl ester, tris(3,5-di-tert-butyl-4-hydroxybenzyl)isocyanurate, and 3,9-bis[1,1-dimethyl-2-[ß-(3-tert-butyl-4-hydroxy-5-methylphenyl)propionyloxy]ethyl]-2,4,8,10-tetraoxaspiro(5,5)undecane.

Specifically, examples of the phenol-based antioxidant may include commercial products such as "Irganox 1010" (manufactured by BASF Japan, trademark), "Irganox 1076" (manufactured by BASF Japan, trademark), "Irganox 1330" (manufactured by BASF Japan, trademark), "Irganox 3114" (manufactured by BASF Japan, trademark), "Irganox 3125" (manufactured by BASF Japan, trademark), "BHT" (manufactured by Takeda Pharmaceutical Company Limited., trademark), "Cyanox 1790" (manufactured by Cyanamid, trademark), and "Sumilizer GA-80" (manufactured by Sumitomo Chemical Company, Limited, trademark).

Examples of the phosphorus-based antioxidant include triphenyl phosphite, diphenyl nonyl phosphite, diphenyl (2-ethylhexyl) phosphite, tris(2,4-di-tert-butylphenyl) phosphite, tris(nonylphenyl) phosphite, diphenyl isooctyl phosphite, 2,2'-methylenebis(4,6-di-tert-butylphenyl)octyl phosphite, diphenyl isodecyl phosphite, diphenyl mono(tridecyl) phosphite, phenyl diisodecyl phosphite, phenyl di(tridecyl) phosphite, tris(2-ethylhexyl) phosphite, tris(isodecyl) phosphite, tris(tridecyl) phosphite, dibutyl hydrogen phosphite, trilauryl trithiophosphite, tetrakis(2,4-di-tert-butylphenyl)-4,4'-biphenylene diphosphonite, 4,4'-isopropylidenediphenol dodecyl phosphite, 4,4'-isopropylidenediphenol tridecyl phosphite, 4,4'-isopropylidenediphenol tetradecyl phosphite, 4,4'-isopropylidenediphenol pentadecyl phosphite, 4,4'-butylidenebis(3-methyl-6-tert-butylphenyl)ditridecyl phosphite, bis(2,4-dicumylphenyl)pentaerythritol diphosphite, bis(2,6-di-tert-butyl-4-methylphenyl)pentaerythritol diphosphite, bis(nonylphenyl)pentaerythritol diphosphite, distearyl-pentaerythritol diphosphite, phenyl bisphenol A pentaerythritol diphosphite, tetraphenyl dipropylene glycol diphosphite, 1,1,3-tris(2-methyl-4-di-tridecylphosphite-5-tert-butylphenyl)butane, 3,4,5,6-dibenzo-1,2-oxaphosphane, triphenylphosphine, diphenylbutylphosphine, diphenyloctadecylphosphine, tris(p-tolyl)phosphine, tris(p-nonylphenyl)phosphine, tris(naphthyl)phosphine, diphenyl (hydroxymethyl)phosphine, diphenynacetoxymethyl) phosphine, diphenyl (ß-ethylcarboxyethyl)phosphine, tris(p-chlorophenyl)phosphine, tris(p-fluorophenyl)phosphine, benzyldiphenylphosphine, diphenyl(ß-cyanoethyl)phosphine, diphenyl(p-hydroxyphenyl)phosphine, diphenyl(1,4-dihydroxyphenyl)-2-phosphine, and phenylnaphthylbenzylphosphine.

Specifically, examples of the phosphorus-based antioxidant may include commercial products such as "Irgafos 168" (manufactured by BASF Japan, trademark), "Irgafos 12" (manufactured by BASF Japan, trademark), "Irgafos 38" (manufactured by BASF Japan, trademark), "ADK STAB 329K" (manufactured by ADEKA Corporation, trademark), "ADK STAB PEP-36" (manufactured by ADEKA Corporation, trademark), "ADK STAB PEP-8" manufactured by ADEKA Corporation, trademark), "Sandstab P-EPQ" (manufactured by Clariant, trademark), "Weston 618" (manufactured by GE, trademark), "Weston 619G" (manufactured by GE, trademark), "Weston 624" (manufactured by GE, trademark), and "Doverphos S-9228PC" (manufactured by Dover Chemical, trademark).

The antioxidants may be used alone or in combination thereof. The content of the antioxidant in the polycarbonate-based resin composition is preferably from 0.01 part by mass to 0.5 part by mass, more preferably from 0.01 part by mass to 0.2 part by mass with respect to 100 parts by mass of the polycarbonate-based resin (A). A case in which the content falls within the ranges is preferred because thermal stability in a molding step or the like, and the long-term thermal stability of the molded article can be maintained, and a reduction in molecular weight of the composition hardly occurs.

As the UV absorber, for example, a benzophenone-based, benzotriazole-based, hydroxyphenyltriazine-based, cyclic imino ester-based, or cyanoacrylate-based UV absorber may be used. Examples of the benzophenone-based UV absorber may include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydridobenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Examples of the benzotriazole-based UV absorber may include 2-(2'-hydroxy-5'-tert-octylphenyl)benzotriazole, 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), and 2-[2-hydroxy-3-(3,4,5,6-tetrahydrophthalimideomethyl)-5-methylphenyl]benzotriazole, and polymers each having a 2-hydroxyphenyl-2H-benzotriazole skeleton, such as a copolymer of 2-(2'-hydroxy-5-methacryloxyethylphenyl)-2H-benzotriazole and a vinyl-based monomer copolymerizable with the monomer, and a copolymer of 2-(2'-hydroxy-5-acryloxyethylphenyl)-2H-benzotriazole and a vinyl-based monomer copolymerizable with the monomer.

Examples of the hydroxyphenyltriazine-based UV absorber include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Examples thereof may also include compounds each obtained by changing a phenyl group of each of the exemplified compounds to a 2,4-dimethylphenyl group, such as 2-(4,6-bis(2,4-dimethylphenyl)-1,3,5-triazin-2-yl)-5-hexyloxyphenol.

Examples of the cyclic imino ester-based UV absorber may include 2,2'-p-phenylenebis(3,1-benzoxazin-4-one), 2,2'-m-phenylenebis(3,1-benzoxazin-4-one), 2,2'-p,p'-diphenylenebis(3,1-benzoxazin-4-one), and 2,2'-(1,4-phenylene)bis[4H-3,1-benzoxazin-4-one].

Examples of the cyanoacrylate-based UV absorber may include 1,3-bis-[(2'-cyano-3',3'-diphenylacryloyl)oxy]-2,2-bis[(2-cyano-3,3-diphenylacryloyl)oxy]methylpropane and 1,3-bis-[(2-cyano-3,3-diphenylacryloyl)oxy]benzene.

The UV absorber may have the structure of a radically polymerizable monomer compound, and be a polymer-type UV absorber obtained by copolymerizing any such UV-absorbable monomer and a monomer such as an alkyl (meth)acrylate. Such UV-absorbable monomer is suitably a compound containing, in the ester substituent of a (meth) acrylic acid ester, a benzotriazole skeleton, a benzophenone skeleton, a triazine skeleton, a cyclic imino ester skeleton, or a cyanoacrylate skeleton. The UV absorbers may be used alone or in combination thereof. A benzophenone-based UV absorber and a benzotriazole-based UV absorber are preferably used as the UV absorber, and it is preferred that the benzophenone-based UV absorber and the benzotriazole-based UV absorber be each used alone or used in combination with each other.

The polycarbonate resin composition of the present invention includes preferably 0.05 part by mass to 1 part by mass, more preferably 0.10 part by mass to 0.50 part by mass, still more preferably 0.10 part by mass to 0.30 part by mass of the UV absorber with respect to 100 parts by mass of the polycarbonate-based resin (A), though the optimum value varies depending on the thickness of a molded article. When the content of the UV absorber falls within the ranges, weatherability can be satisfactorily maintained. The above-mentioned UV absorbers may be used alone or in combination thereof. When the composition includes a plurality of kinds of UV absorbers, their total amount falls within the ranges.

The light diffuser is blended in order to impart a light-diffusing effect, and is not particularly limited, and a known light diffuser may be used. Examples thereof include a crosslinked acrylic resin, a crosslinked polystyrene resin, a silicone resin, a fluorine-based resin, silica, quartz, titanium oxide, and zinc oxide.

Among them, a Si-based light diffuser is preferred because the Si-based light diffuser can aid the expression of flame retardancy and impart a light-diffusing effect. The Si-based light diffuser is not particularly limited as long as the light diffuser contains silicon (Si), and a known Si-based light diffuser may be used. Examples thereof include a silicone-based elastomer and a silicone resin. Among them, organic fine particles formed of a silicone resin are preferred because the organic fine particles have good residence thermal stability during molding or the like and have a flame retardancy-improving effect, and the particle diameter thereof is preferably from 0.5 µm to 10 µm, more preferably from 1 µm to 5 µm.

The content of the light diffuser in the polycarbonate resin composition in the present invention is preferably from 0.1 part by mass to 5.0 parts by mass, more preferably from 0.1 part by mass to 4.0 parts by mass, still more preferably from 0.1 part by mass to 3.0 parts by mass with respect to 100 parts by mass of the polycarbonate-based resin (A), though the optimum value varies depending on the thickness of a molded article. When the content of the light diffuser falls within the ranges, sufficient diffusion performance is obtained, and at the same time, the strength of a molded article can be sufficiently maintained. In the case where the light diffuser is added, the total light transmittance is reduced overall in accordance with its addition amount. Even in this case, however, according to the present invention, a difference in transmittance depending on the thickness of a test piece is small, and an excellent transmittance can be maintained.

By virtue of having the composition described above, the polycarbonate-based resin composition of the present invention is excellent in transparency and also excellent in thin-wall flame retardancy. Its transparency and flame retardancy are specifically as described below, while details thereof are described in Examples.

<<Transparency>>

As measured by the following method A, a total light transmittance of 70% or more can be achieved for the 3-millimeter thick portion of a test piece. The total light transmittance of the 3-millimeter thick portion is more preferably 72% or more, still more preferably 74% or more.

Method A: a test piece that is a three-stage plate measuring 90 mm×50 mm, including the 3-millimeter thick portion measuring 45 mm×50 mm, a 2-millimeter thick portion measuring 22.5 mm×50 mm, and a 1-millimeter thick portion measuring 22.5 mm×50 mm, is produced using a pellet obtained from the polycarbonate-based resin composition by an injection molding method at a molding temperature of 310° C. and a mold temperature of 95° C., and is subjected to measurement of the total light transmittance in conformity with JIS K 7375:2008.

The polycarbonate-based resin composition of the present invention can also suppress the difference in transparency depending on the thickness of the test piece to a low level. Specifically, a ratio between the total light transmittance of the 3-millimeter thick portion of the test piece and the total light transmittance of the 1-millimeter thick portion thereof (total light transmittance at a thickness of 3 mm/total light transmittance at a thickness of 1 mm), which are measured by the method A, can be set to 0.70 or more. As the ratio between the total light transmittances increases, the difference in transmittance depending on the thickness of the test piece becomes smaller, indicating more excellent transparency. The ratio between the total light transmittances is more preferably 0.76 or more, still more preferably 0.80 or more.

<<Flame Retardancy>>

When the polycarbonate-based resin composition of the present invention is molded to have a thickness of 1.0 mm (1.0 mmt), a result corresponding to any one of V-2, V-1, or V-0 can be obtained under a UL94 standard. Thin-wall flame retardancy at an extremely high level of a thickness of 1.0 mm can be achieved.

<Method of Producing Polycarbonate-Based Resin Composition>

The polycarbonate-based resin composition of the present invention may be obtained by blending and mixing the above-mentioned components, and kneading the mixture.

A kneading method is not particularly limited, and an example thereof is a method using, for example, a ribbon blender, a Henschel mixer, a Banbury mixer, a drum tumbler, a single-screw extruder, a twin-screw extruder, a cokneader, or a multi-screw extruder. In addition, a heating temperature at the time of the kneading is selected from the range of typically from 240° C. to 330° C., preferably from 250° C. to 320° C.

In this case, the blending is preferably performed so that the branching ratio of the polycarbonate-based resin (A) may be 0.01 mol % or more and 3.0 mol % or less. The branched polycarbonate-based resin (A-1) and the aromatic polycarbonate-based resin (A-2) except the resin (A-1) may be blended so that the branching ratio of the polycarbonate-based resin (A) may be more preferably 0.3 mol % or more, still more preferably 0.5 mol % or more, still further more preferably 0.7 mol % or more, still further more preferably 1.0 mol % or more, still further more preferably 1.4 mol % or more, still further more preferably 1.5 mol % or more, and more preferably 2.8 mol % or less, still more preferably 2.6 mol % or less, still further more preferably 2.3 mol % or less, still further more preferably 2.0 mol % or less. When the branching ratio in the polycarbonate-based resin (A) falls within the ranges, a polycarbonate-based resin composition excellent in flame retardancy, specifically excellent in thin-wall flame retardancy is obtained.

A component to be incorporated except the polycarbonate-based resin may be added after having been melt-kneaded together with the polycarbonate-based resin or any other thermoplastic resin in advance, that is, as a master batch.

<Molded Article>

A molded article formed of the polycarbonate-based resin composition of the present invention may be obtained by molding the polycarbonate-based resin composition of the present invention.

Various conventionally known molding methods may each be used as a molding method, and examples thereof include an injection molding method, an injection compression molding method, an extrusion molding method, a profile extrusion molding method, a blow molding method, a press molding method, a vacuum molding method, and an expansion molding method.

It is preferred that the polycarbonate-based resin composition be pelletized, and molding be performed using the pellet. A general molding method, such as an injection molding method, an injection compression molding method, or extrusion molding, or a special molding method, such as a gas-assisted molding method or a profile extrusion molding, may be used. Thus, various molded articles can be produced.

When the molded article of the present invention is used as an appearance member, a molding technology for an improvement in appearance, such as a heat cycle molding method, a high-temperature mold, or a heat-insulating mold, is preferably used.

The molded article obtained by molding the polycarbonate-based resin composition of the present invention is excellent in flame retardancy and transparency, and hence can be suitably used as various optical molded articles, for example, lighting equipment diffusion covers each made of a resin, such as a lighting cover and a display cover, and a lens. Further, the molded article is suitably used as, for example, a lighting cover for a streetlight and a lens each of which is used in a high-temperature and high-humidity environment.

EXAMPLES

Now, the present invention is more specifically described by way of Examples. However, the present invention is by no means limited by these Examples.

In each example, characteristic values and evaluation results were determined in the following manner.

(1) Branching Ratio of Polycarbonate-Based Resin (A)

The branching ratio of a polycarbonate-based resin (A) of each of Examples and Comparative Examples to be described later was determined through $^1$H-NMR measurement. The branching ratio was determined as "number of moles of structural unit derived from branching agent/total number of moles of (structural unit derived from dihydric phenol+structural unit derived from branching agent+terminal unit)×100" (represented in the unit of mol %).

(2) Flame Retardancy

With use of a pellet obtained from each of polycarbonate-based resin compositions of Examples and Comparative Examples to be described later, a vertical flame test was performed for a test piece having a length of 127 mm, a width of 12.7 mm, and a thickness of 1 mm produced in conformity with a UL94 standard. Flame retardancy was evaluated by being classified as a rank V-0, V-1, V-2, or Not-V on the basis of the result of the test.

The UL94 standard is a method of evaluating flame retardancy from an afterflame time after the flame of a burner has been brought into contact with a test piece having a predetermined size, which has been vertically held, for 10 seconds. In addition, the number of drips represents the number of times the sample dripped a flaming drip out of five times of the test performed in accordance with the UL94 standard.

(3) Total Light Transmittance (%)

The pellet obtained from each of the polycarbonate-based resin compositions of Examples and Comparative Examples to be described later was molded with an injection molding machine [MD50X manufactured by Niigata Machine Techno Co., Ltd.] at a molding temperature of 310° C. and a mold temperature of 95° C. to produce a test piece that was a three-stage plate measuring 90 mm×50 mm (3-millimeter thick portion: 45 mm×50 mm, 2-millimeter thick portion: 22.5 mm×50 mm, 1-millimeter thick portion: 22.5 mm×50 mm), and its total light transmittance was measured. The total light transmittance was measured in conformity with JIS K 7375:2008 through use of a tester NDH 5000 manufactured by Nippon Denshoku Industries Co., Ltd. The measurement was performed for each of the 1-millimeter thick portion and 3-millimeter thick portion of the three-stage plate test piece.

Evaluation based on a ratio between the measured total light transmittance at a thickness of 3 mm and total light transmittance at a thickness of 1 mm was also performed. A case in which the ratio "(total light transmittance at a thickness of 3 mm)/(total light transmittance at a thickness of 1 mm)" was 0.85 or more was graded A, a case in which the ratio was less than 0.85 and more than 0.75 was graded B, a case in which the ratio was 0.75 or less and more than 0.70 was graded C, and a case in which the ratio was 0.70 or less was graded D.

(4) Evaluation of Polytetrafluoroethylene (PTFE) Aggregate

With use of the three-stage plate used in the measurement of the total light transmittances, the 3-millimeter portion of the three-stage plate was evaluated. An optical microscope [BX51 manufactured by Olympus Corporation] was used for the evaluation, and the evaluation was performed by the following criteria.

A There are no or few aggregates.
B Aggregates are inconspicuous.
C Aggregates are conspicuous.

The following raw materials were used in Examples.
(A) Polycarbonate (PC)-Based Resin
(A-1) Branched Polycarbonate-Based Resin (Branched PC)

Production Example 1 (Production of Branched PC1: 0.40 mol % of THPE)

(Polycarbonate Oligomer (i) Synthesis Step)

Sodium dithionite was added in an amount of 2,000 ppm by mass with respect to bisphenol A (BPA) to be dissolved later to 5.6 wt % aqueous sodium hydroxide, and BPA was dissolved in the mixture so that the concentration of BPA became 13.5 wt %. Thus, a solution of BPA in aqueous sodium hydroxide was prepared.

Sodium dithionite was added in an amount of 2,000 ppm by mass with respect to 1,1,1-tris(4-hydroxyphenylethane) (THPE) to be dissolved later to 5.6 wt % aqueous sodium hydroxide, and THPE was dissolved in the mixture so that the concentration of THPE became 11.3 wt %. Thus, a solution of THPE in aqueous sodium hydroxide was prepared.

The solution of BPA in aqueous sodium hydroxide, the solution of THPE in aqueous sodium hydroxide, methylene chloride, and phosgene were continuously passed through a tubular reactor having an inner diameter of 6 mm and a tube length of 30 m at flow rates of 42 L/hr, 0.41 L/hr, 15 L/hr, and 4.0 kg/hr, respectively. The tubular reactor had a jacket portion and the temperature of the reaction liquid was kept at 40° C. or less by passing cooling water through the jacket.

The reaction liquid that had exited the tubular reactor was continuously introduced into a baffled vessel-type reactor provided with a sweptback blade and having an internal volume of 40 L. 2.8 L/hr of the solution of BPA in aqueous sodium hydroxide, 0.07 L/hr of 25 wt % aqueous sodium hydroxide, 17 L/hr of water, 0.69 L/hr of a 1 wt % aqueous solution of triethylamine, and 3.4 L/hr of a solution of p-tert-butylphenol (PTBP) in methylene chloride (concentration: 4.0 wt %) were further added to the reactor to perform a reaction.

An aqueous phase was separated and removed by continuously taking out the reaction liquid overflowing the vessel-type reactor and leaving the reaction liquid at rest. Then, a methylene chloride phase was collected.

The resultant polycarbonate oligomer had a concentration of 329 g/L and a chloroformate group concentration of 0.74 mol/L.

(Step of Producing Polycarbonate-Based Resin)

15 L of the previously obtained polycarbonate oligomer solution, 10.2 L of methylene chloride, and 2.8 mL of triethylamine were loaded into a 50-liter vessel-type reactor including a baffle board, a paddle-type stirring blade, and a cooling jacket, and were mixed with each other.

A solution of BPA in aqueous sodium hydroxide (prepared by dissolving 1,166 g of BPA in an aqueous solution prepared by dissolving 639 g of NaOH and 2.3 g of sodium dithionite in 9.3 L of water) was added to the mixed liquid to perform a polymerization reaction for 60 minutes.

10 L of methylene chloride was added to the resultant for dilution and the mixture was stirred for 10 minutes. After that, the mixture was separated into an organic phase containing a polycarbonate resin, and an aqueous phase containing excess amounts of BPA and NaOH, and the organic phase was isolated.

The solution of the resultant polycarbonate in methylene chloride was sequentially washed with 0.03 mol/L aqueous sodium hydroxide and 0.2 N hydrochloric acid in amounts of 15 vol % each with respect to the solution. Next, the solution was repeatedly washed with pure water until an electric conductivity in an aqueous phase after the washing became 0.01 µS/m or less. The solution of the polycarbonate-based resin in methylene chloride obtained by the washing was concentrated and pulverized, and the flake was dried under reduced pressure at 120° C.

The branching ratio of the resultant branched polycarbonate-based resin 1 determined by $^1$H-NMR was 0.40 mol %, and the viscosity-average molecular weight My thereof measured in conformity with ISO 1628-4 (1999) was 17,400.

Production Example 2 (Production of Branched PC2: 0.90 mol % of THPE)

A branched polycarbonate-based resin 2 was obtained by the same method as that of Production Example 1 except that, in the polycarbonate oligomer synthesis step, the supply amount of the solution of THPE in aqueous sodium hydroxide was set to 0.87 L/hr and the supply amount of the solution of PTBP in methylene chloride (concentration: 4.0 wt %) was set to 4.6 L/hr. The polycarbonate oligomer obtained in the polycarbonate oligomer synthesis step had a concentration of 330 g/L and a chloroformate group concentration of 0.72 mol/L.

The branching ratio determined by $^1$H-NMR was 0.90 mol %, and the viscosity-average molecular weight Mv thereof measured in conformity with ISO 1628-4 (1999) was 22,800.

Production Example 3 (Production of Branched PC3: 1.50 mol % of THPE)

A branched polycarbonate-based resin 3 was obtained by the same method as that of Production Example 1 except that, in the polycarbonate oligomer synthesis step, the supply amount of the solution of THPE in aqueous sodium hydroxide was set to 1.55 L/hr and the supply amount of the solution of PTBP in methylene chloride (concentration: 4.0 wt %) was set to 6.6 L/hr. The polycarbonate oligomer obtained in the polycarbonate oligomer synthesis step had a concentration of 328 g/L and a chloroformate group concentration of 0.71 mol/L.

The branching ratio determined by $^1$H-NMR was 1.50 mol %, and the viscosity-average molecular weight Mv thereof measured in conformity with ISO 1628-4 (1999) was 17,300.

Production Example 4 (Production of Branched PC4: 2.30 mol % of THPE)

A branched polycarbonate-based resin 4 was obtained by the same method as that of Production Example 1 except that, in the polycarbonate oligomer synthesis step, the supply amount of the solution of THPE in aqueous sodium hydroxide was set to 2.32 L/hr and the supply amount of the solution of PTBP in methylene chloride (concentration: 4.0 wt %) was set to 6.5 L/hr. The polycarbonate oligomer obtained in the polycarbonate oligomer synthesis step had a concentration of 334 g/L and a chloroformate group concentration of 0.73 mol/L.

The branching ratio determined by $^1$H-NMR was 2.30 mol %, and the viscosity-average molecular weight Mv thereof measured in conformity with ISO 1628-4 (1999) was 23,000.

(A-2): Aromatic Polycarbonate-Based Resin
TARFLON FN2500A [manufactured by Idemitsu Kosan Co., Ltd., homopolycarbonate produced from bisphenol A, viscosity-average molecular weight=23,500]
TARFLON FN1700 [manufactured by Idemitsu Kosan Co., Ltd., homopolycarbonate produced from bisphenol A, viscosity-average molecular weight=17,700]
(B) Fluorine-Containing Compound
(B1): Fluorine-Containing Compound Having Perfluoroalkylene Unit
PTFE 1, METABLEN A3800 [manufactured by Mitsubishi Chemical Corporation: 50 mass % of polytetrafluoroethylene and 50 mass % of polyalkyl (meth)acrylate having an alkyl group having 4 or more carbon atoms]
PTFE 2 (water dispersion of PTFE), Polyflon D210C [manufactured by Daikin Industries, Ltd.: 60 mass % of polytetrafluoroethylene, average particle diameter: 0.22 μm]
(B2): Fluorine-Containing Compound Having Perfluoroalkyl Group
Nonafluorobutanesulfonic acid potassium salt [manufactured by Mitsubishi Materials Corporation, product name: "Eftop KFBS"]

(C) Polyether Having Polyoxyalkylene Structure
(C1): PEG-PPG "UNILUBE 50DE-25" (manufactured by NOF Corporation, polyoxyethylene glycol-polyoxypropylene glycol, Mn: 1,750)
(C2): PPG "UNIOL D-2000" (manufactured by NOF Corporation, polypropylene glycol, Mn: 2,000)
(C3): PEG "PEG #2000" (manufactured by NOF Corporation, polyethylene glycol, Mn: 2,000)
(C4): PPG-PTMG "POLYCERIN DCB-2000" (manufactured by NOF Corporation, polyoxyethylene glycol-polyoxypropylene glycol, Mn: 2,000)
(C5): PEG-PTMG "POLYCERIN DC-1800E" (manufactured by NOF Corporation, polyoxytetramethylene glycol-polyoxyethylene glycol, Mn: 1,800)
(C6): PTMG "PTMG2000" (manufactured by Mitsubishi Chemical Corporation, polyoxytetramethylene glycol, Mn=2,000)
(C7): PO3G "ECOPROL2000" (manufactured by SK Chemicals Co., Ltd., polyoxytrimethylene glycol (PO3G), Mn=2,000)
Other Additives
<Antioxidant>
"Doverphos S-9228PC" (manufactured by Dover Chemical, bis(2,4-dicumylphenyl)pentaerythritol diphosphite, abbreviated as Dover28 in the tables)
"Irgafos 168" (manufactured by BASF Japan, tris(2,4-di-tert-butylphenyl) phosphite, abbreviated as Irg 168 in the tables]
"ADK STAB PEP-36" (manufactured by ADEKA Corporation, bis(2,6-di-tert-butyl-4-methylphenyl)pentaerythritol diphosphite, abbreviated as PEP-36 in the tables)
"Irganox 1076" (manufactured by BASF Japan, octadecyl-3-(3,5-di-tert-butyl-4-hydroxyphenyl)propionate, abbreviated as Irg 1076 in the tables)
<Flame Retardant>
"KR511" (manufactured by Shin-Etsu Chemical Co., Ltd., reactive silicone compound containing a phenyl group, a methoxy group, and a vinyl group, refractive index=1.518)
<UV Absorber>
"ChemiSorb 79" (manufactured by Chemipro Kasei Kaisha, Ltd., 2-(2'-hydroxy-5'-tert-octylphenyl)benzotriazole)
"Cyasorb UV-3638" (manufactured by Cytec Industries Inc., 2,2'41,4-phenylene)bis[4H-3,1-benzoxazin-4-one), abbreviated as UV-3638 in the tables)
<Light Diffuser>
"KMP590" (manufactured by Shin-Etsu Chemical Co., Ltd., crosslinked silicone resin particles, average particle diameter: 5 μm)

Examples 1 to 34 and Comparative Examples 1 to 8

Respective components were mixed at ratios shown in Tables 1 to 5, and each of the mixtures was supplied to a vented twin-screw extrusion molding machine [manufactured by Toshiba Machine Co., Ltd.: TEM37SS], and was melt-kneaded at a barrel temperature of from 270° C. to 280° C., a screw revolution number of 300 rpm, and an ejection amount of 50 kg/hr to provide an evaluation pellet sample. The resultant pellet was dried at 120° C. for 5 hours, and then subjected to various evaluations as described above. The results are shown together in Tables 1 to 5. In the tables, "Branching mol" represents the branching ratio (mol %) of the polycarbonate-based resin (A).

TABLE 1-1

| | | Example | | | | | | | | | |
|---|---|---|---|---|---|---|---|---|---|---|---|
| | | 1 | 2 | 3 | 4 | 5 | 6 | 7 | 8 | 9 | 10 |
| PC based resin (A) | | | | | | | | | | | |
| (A-1) Branched PC1 (0.4 mol %) | mass % | 100 | | | | | | | | | |
| Branched PC2 (0.9 mol %) | mass % | | 100 | | | 100 | 100 | 100 | 70 | 70 | 70 |
| Branched PC3 (1.5 mol %) | mass % | | | 100 | | | | | | | |
| Branched PC4 (2.3 mol %) | mass % | | | | 100 | | | | | | |
| (A-2) FN2500 | mass % | | | | | | | | 30 | 30 | 30 |
| FN1700 | mass % | | | | | | | | | | |
| Branching mol | mol % | 0.40 | 0.90 | 1.50 | 2.30 | 0.90 | 0.90 | 0.90 | 0.63 | 0.63 | 0.63 |
| Fluorine-containing compound (B) | | | | | | | | | | | |
| (B-1) PTFE1 (A3800) | part by mass | | | | | | | | | | |
| PTFE2 (D210C) | part by mass | 0.10 | 0.10 | 0.10 | 0.10 | 0.15 | 0.15 | 0.15 | 0.15 | 0.15 | 0.15 |
| PTFE content | part by mass | 0.06 | 0.06 | 0.06 | 0.06 | 0.09 | 0.09 | 0.09 | 0.09 | 0.09 | 0.09 |
| (B-2) EFTOP KFBS | part by mass | 0.10 | 0.10 | 0.10 | 0.10 | 0.10 | 0.10 | 0.10 | 0.10 | 0.10 | 0.10 |
| Amount of fluorine-containing compound (B) | part by mass | 0.16 | 0.16 | 0.16 | 0.16 | 0.19 | 0.19 | 0.19 | 0.19 | 0.19 | 0.19 |
| Polyether (C) | | | | | | | | | | | |
| (C1) PEG-PPG | part(s) by mass | 0.20 | 0.20 | 0.20 | 0.20 | 0.50 | 1.00 | 1.50 | 0.10 | 0.20 | 0.50 |
| (C2) PPG | part by mass | | | | | | | | | | |
| (C3) PEG | part by mass | | | | | | | | | | |
| (C4) PPG-PTMG | part by mass | | | | | | | | | | |
| (C5) PEG-PTMG | part by mass | | | | | | | | | | |
| (C6) PTMG | part by mass | | | | | | | | | | |
| (C7) P03G | part by mass | | | | | | | | | | |
| Antioxidant | | | | | | | | | | | |
| Dover28 | part by mass | 0.10 | 0.10 | 0.10 | 0.10 | 0.10 | 0.10 | 0.10 | 0.10 | 0.10 | 0.10 |
| Irg 168 | part by mass | | | | | | | | | | |
| PEP-36 | part by mass | | | | | | | | | | |
| Irg 1076 | part by mass | | | | | | | | | | |
| (B)/(C) | | 0.80 | 0.80 | 0.80 | 0.80 | 0.38 | 0.19 | 0.13 | 1.90 | 0.95 | 0.38 |
| PTFE/(C) | | 0.30 | 0.30 | 0.30 | 0.30 | 0.18 | 0.09 | 0.06 | 0.90 | 0.45 | 0.18 |
| PTFE*Branching mol | | 0.024 | 0.054 | 0.090 | 0.138 | 0.081 | 0.081 | 0.081 | 0.057 | 0.057 | 0.057 |

TABLE 1-2

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Flame retardancy (1 mmt) | Number of drips/5 | | 2 | 0 | 0 | 0 | 0 | 0 | 5 | 0 | 0 | 0 |
| | | | V-2 | V-0 | V-0 | V-0 | V-0 | V-1 | V-2 | V-0 | V-0 | V-0 |
| Total light transmittance | 1 mmt | % | 87 | 87 | 86 | 87 | 86 | 87 | 88 | 86 | 86 | 86 |
| | 3 mmt | % | 78 | 78 | 78 | 79 | 77 | 80 | 81 | 75 | 76 | 77 |
| | 3 mmt/1 mmt | | 0.90 | 0.90 | 0.91 | 0.91 | 0.90 | 0.92 | 0.92 | 0.87 | 0.88 | 0.90 |
| | Evaluation of 3 mmt/1 mmt | | A | A | A | A | A | A | A | A | A | A |
| Aggregation of PTFE | | | A | A | A | A | A | A | A | A | A | A |

TABLE 2-1

| | | | Example | | | | | | | | | | | |
|---|---|---|---|---|---|---|---|---|---|---|---|---|---|---|
| | | | 11 | 12 | 13 | 14 | 15 | 16 | 17 | 18 | 19 | 20 | 21 | 22 |
| PC-based resin (A) | | | | | | | | | | | | | | |
| (A-1) Branched PC1 (0.4 mol %) | | mass % | | | | | | | | | | | | |
| Branched PC2 (0.9 mol %) | | mass % | 70 | 70 | 70 | 70 | 70 | 70 | 70 | 70 | 70 | 70 | 70 | 70 |
| Branched PC3 (1.5 mol %) | | mass % | | | | | | | | | | | | |
| Branched PC4 (2.3 mol %) | | mass % | | | | | | | | | | | | |
| (A-2) FN2500 | | mass % | 30 | 30 | 30 | 30 | 30 | 30 | 30 | 30 | 30 | 30 | 30 | 30 |
| FN1700 | | mass % | | | | | | | | | | | | |
| Branching mol | | mol % | 0.63 | 0.63 | 0.63 | 0.63 | 0.63 | 0.63 | 0.63 | 0.63 | 0.63 | 0.63 | 0.63 | 0.63 |
| Fluorine-containing compound (B) | | | | | | | | | | | | | | |
| (B-1) PTFE1 (A3800) | | part by mass | | | | | | | 0.15 | | | | | |
| PTFE2 (D210C) | | part by mass | 0.15 | 0.15 | 0.15 | 0.15 | 0.15 | 0.15 | | 0.15 | 0.15 | 0.15 | 0.15 | 0.15 |
| PTFE content | | part by mass | 0.09 | 0.09 | 0.09 | 0.09 | 0.09 | 0.09 | 0.08 | 0.09 | 0.09 | 0.09 | 0.09 | 0.09 |
| (B-2) EFTOP KFBS | | part by mass | 0.10 | 0.10 | 0.10 | 0.10 | 0.10 | 0.10 | 0.10 | 0.10 | 0.10 | 0.10 | 0.10 | 0.10 |
| Amount of fluorine-containing compound (B) | | part by mass | 0.19 | 0.19 | 0.19 | 0.19 | 0.19 | 0.19 | 0.18 | 0.19 | 0.19 | 0.19 | 0.19 | 0.19 |
| Polyether (C) | | | | | | | | | | | | | | |
| (C1) PEG-PPG | | part by mass | | | | | | | 0.30 | 0.20 | 0.20 | 0.20 | 0.20 | 0.20 |
| (C2) PPG | | part by mass | 0.20 | | | | | | | | | | | |
| (C3) PEG | | part by mass | | | 0.20 | | | | | | | | | |
| (C4) PPG-PTMG | | part by mass | | | | 0.20 | | | | | | | | |
| (C5) PEG-PTMG | | part by mass | | | | | 0.20 | | | | | | | |
| (C6) PTMG | | part by mass | | | | | | 0.20 | | | | | | |
| (C7) P03G | | part by mass | | | | | | | 0.20 | | | | | |
| Antioxidant | | | | | | | | | | | | | | |
| Dover28 | | part by mass | 0.05 | 0.05 | 0.05 | 0.05 | 0.05 | 0.05 | 0.10 | 0.20 | 0.03 | | | |
| Irg 168 | | part by mass | | | | | | | | | | 0.10 | | |
| PEP-36 | | part by mass | | | | | | | | | | | 0.10 | |
| Irg 1076 | | part by mass | | | | | | | | | | | | 0.10 |
| (B)/(C) | | | 0.95 | 0.95 | 0.95 | 0.95 | 0.95 | 0.95 | 0.60 | 0.95 | 0.95 | 0.95 | 0.95 | 0.95 |
| PTFE/(C) | | | 0.45 | 0.45 | 0.45 | 0.45 | 0.45 | 0.45 | 0.27 | 0.45 | 0.45 | 0.45 | 0.45 | 0.45 |
| PTFE*Branching mol | | | 0.057 | 0.057 | 0.057 | 0.057 | 0.057 | 0.057 | 0.050 | 0.057 | 0.057 | 0.057 | 0.057 | 0.057 |

TABLE 2-2

| | | | Example | | | | | | | | | | | |
|---|---|---|---|---|---|---|---|---|---|---|---|---|---|---|
| | | | 11 | 12 | 13 | 14 | 15 | 16 | 17 | 18 | 19 | 20 | 21 | 22 |
| Flame retardancy (1 mmt) Number of drips/5 | | | 0 | 0 | 0 | 0 | 0 | 0 | 0 | 0 | 0 | 0 | 0 | 0 |
| | | | V-0 | V-0 | V-0 | V-0 | V-0 | V-0 | V-0 | V-0 | V-0 | V-0 | V-0 | V-0 |
| Total light transmittance | 1 mmt | % | 85 | 85 | 86 | 85 | 86 | 86 | 85 | 86 | 86 | 85 | 86 | 85 |
| | 3 mmt | % | 74 | 74 | 75 | 74 | 74 | 75 | 74 | 75 | 74 | 74 | 75 | 74 |
| | 3 mmt/1 mmt | | 0.87 | 0.87 | 0.87 | 0.87 | 0.86 | 0.87 | 0.87 | 0.87 | 0.86 | 0.87 | 0.87 | 0.87 |
| | Evaluation of 3 mmt/1 mmt | | A | A | A | A | A | A | A | A | A | A | A | A |
| Aggregation of PTFE | | | A | A | A | A | A | A | A | A | A | A | A | A |

TABLE 3-1

| | | | Example | | | | | | | | | |
|---|---|---|---|---|---|---|---|---|---|---|---|---|
| | | | 23 | 24 | 25 | 26 | 27 | 28 | 29 | 30 | 31 | 32 |
| PC-based resin (A) | | | | | | | | | | | | |
| (A-1) | Branched PC1 (0.4 mol %) | mass % | | | | | | | | | | |
| | Branched PC2 (0.9 mol %) | mass % | 70 | 70 | 70 | 70 | 70 | 70 | | 50 | 70 | |
| | Branched PC3 (1.5 mol %) | mass % | | | | | | | | | | |
| | Branched PC4 (2.3 mol %) | mass % | | | | | | | | | | |
| (A-2) | FN2500 | mass % | 30 | 30 | 30 | 30 | 30 | 30 | 100 | | 30 | 100 |
| | FN1700 | mass % | | | | | | | | 50 | | |
| Branching mol | | mol % | 0.63 | 0.63 | 0.63 | 0.63 | 0.63 | 0.63 | 0.00 | 0.45 | 0.63 | 0.00 |
| Fluorine-containing compound (B) | | | | | | | | | | | | |
| (B-1) | PTFE1 (A3800) | part by mass | | | | | | | 0.15 | | 0.30 | |
| | PTFE2 (D210C) | part by mass | 0.15 | 0.15 | 0.15 | 0.15 | 0.15 | 0.15 | | 0.15 | | 0.50 |
| PTFE content | | part by mass | 0.09 | 0.09 | 0.09 | 0.09 | 0.09 | 0.09 | 0.08 | 0.09 | 0.15 | 0.30 |
| (B-2) | EFTOP KFBS | part by mass | 0.10 | 0.10 | 0.10 | 0.10 | 0.10 | 0.10 | 0.10 | 0.10 | 0.10 | 0.10 |
| Amount of fluorine-containing compound (B) | | part by mass | 0.19 | 0.19 | 0.19 | 0.19 | 0.19 | 0.19 | 0.18 | 0.19 | 0.25 | 0.40 |
| Polyether (C) | | | | | | | | | | | | |
| | (C1) PEG-PPG | part by mass | 0.20 | 0.20 | 0.50 | 0.20 | 0.20 | 0.50 | 0.50 | 0.10 | 0.50 | 0.30 |
| | (C2) PPG | part by mass | | | | | | | | | | |
| | (C3) PEG | part by mass | | | | | | | | | | |
| | (C4) PPG-PTMG | part by mass | | | | | | | | | | |
| | (C5) PEG-PTMG | part by mass | | | | | | | | | | |
| | (C6) PTMG | part by mass | | | | | | | | | | |
| | (C7) P03G | part by mass | | | | | | | | | | |
| Antioxidant | | | | | | | | | | | | |
| | Dover28 | part by mass | 0.05 | 0.05 | 0.05 | 0.05 | 0.05 | 0.05 | 0.10 | 0.10 | 0.10 | 0.10 |
| | Irg 168 | part by mass | | | | | | | | | | |
| | PEP-36 | part by mass | | | | | | | | | | |
| | Irg 1076 | part by mass | | | | | | | | | | |
| Flame retardant | KR-511 | part by mass | 0.30 | | | | | | | | | |
| UV absorber | ChemiSorb 79 | part by mass | | 0.20 | 0.20 | | | | | | | |
| | UV-3638 | part by mass | | | | 0.10 | 0.20 | 0.20 | | | | |
| Light diffuser | KMP590 | part by mass | | | | | | | | | | |
| (B)/(C) | | | 0.95 | 0.95 | 0.38 | 0.95 | 0.95 | 0.38 | 0.36 | 1.90 | 0.50 | 1.33 |
| PTFE/(C) | | | 0.45 | 0.45 | 0.18 | 0.45 | 0.45 | 0.18 | 0.16 | 0.90 | 0.30 | 1.00 |
| PTFE*Branching mol | | | 0.057 | 0.057 | 0.057 | 0.057 | 0.057 | 0.057 | 0.000 | 0.041 | 0.095 | 0.000 |

TABLE 3-2

|  |  |  | Example | | | | | | | | | |
|---|---|---|---|---|---|---|---|---|---|---|---|---|
|  |  |  | 23 | 24 | 25 | 26 | 27 | 28 | 29 | 30 | 31 | 32 |
| Flame retardancy (1 mmt) | Number of drips/5 |  | 0 | 0 | 0 | 0 | 0 | 0 | 0 | 0 | 0 | 0 |
|  |  |  | V-0 | V-0 | V-0 | V-0 | V-0 | V-0 | V-0 | V-0 | V-0 | V-0 |
| Total light transmittance | 1 mmt | % | 87 | 86 | 88 | 87 | 87 | 88 | 85 | 87 | 79 | 77 |
|  | 3 mmt | % | 76 | 75 | 80 | 77 | 77 | 81 | 72 | 78 | 60 | 55 |
|  | 3 mmt/1 mmt |  | 0.87 | 0.87 | 0.91 | 0.89 | 0.89 | 0.92 | 0.85 | 0.90 | 0.76 | 0.71 |
|  | Evaluation of 3 mmt/1 mmt |  | A | A | A | A | A | A | A | A | B | C |
| Aggregation of PTFE |  |  | A | A | A | A | A | A | A | A | B | C |

TABLE 4

|  |  |  | Comparative Example | | | | | |
|---|---|---|---|---|---|---|---|---|
|  |  |  | 1 | 2 | 3 | 4 | 5 | 6 |
| PC-based resin (A) |  |  |  |  |  |  |  |  |
| (A-1) | Branched PC1 (0.4 mol %) | mass % |  |  |  |  |  |  |
|  | Branched PC2 (0.9 mol %) | mass % | 70 | 70 | 70 |  | 70 |  |
|  | Branched PC3 (1.5 mol %) | mass % |  |  |  |  |  |  |
|  | Branched PC4 (2.3 mol %) | mass % |  |  |  |  |  |  |
| (A-2) | FN2500 | mass % | 30 | 30 | 30 | 100 | 30 | 100 |
|  | FN1700 | mass % |  |  |  |  |  |  |
| Branching mol |  | mol % | 0.63 | 0.63 | 0.63 | 0.00 | 0.63 | 0.00 |
| Fluorine-containing compound (B) |  |  |  |  |  |  |  |  |
| (B-1) | PTFE1 (A3800) | part by mass |  |  | 0.15 | 0.15 | 0.30 |  |
|  | PTFE2 (D210C) | part by mass | 0.15 | 0.15 |  |  |  | 0.50 |
| PTFE content |  | part by mass | 0.09 | 0.09 | 0.08 | 0.08 | 0.15 | 0.30 |
| (B-2) | EFTOP KFBS | part by mass | 0.10 | 0.10 | 0.10 | 0.10 | 0.10 | 0.10 |
| Amount of fluorine-containing compound (B) |  | part by mass | 0.19 | 0.19 | 0.18 | 0.18 | 0.25 | 0.40 |
| Polyether (C) |  |  |  |  |  |  |  |  |
|  | (C1) PEG-PPG | part by mass | 0.01 |  |  |  |  |  |
|  | (C2) PPG | part by mass |  |  |  |  |  |  |
|  | (C3) PEG | part by mass |  |  |  |  |  |  |
|  | (C4) PPG-PTMG | part by mass |  |  |  |  |  |  |
|  | (C5) PEG-PTMG | part by mass |  |  |  |  |  |  |
|  | (C6) PTMG | part by mass |  |  |  |  |  |  |
|  | (C7) P03G | part by mass |  |  |  |  |  |  |
| Antioxidant |  |  |  |  |  |  |  |  |
|  | Dover28 | part by mass | 0.10 | 0.10 | 0.10 | 0.10 | 0.10 | 0.10 |
|  | Irg 168 | part by mass |  |  |  |  |  |  |
|  | PEP-36 | part by mass |  |  |  |  |  |  |
|  | Irg 1076 | part by mass |  |  |  |  |  |  |
| Flame retardant | KR-511 | part by mass |  |  |  |  |  |  |
| UV absorber | ChemiSorb 79 | part by mass |  |  |  |  |  |  |
|  | UV-3638 | part by mass |  |  |  |  |  |  |
| Light diffuser | KMP590 | part by mass |  |  |  |  |  |  |
| (B)/(C) |  |  | 19.00 | — | — | — | — | — |
| PTFE/(C) |  |  | 9.00 | — | — | — | — | — |
| PTFE*Branching mol |  |  | 0.057 | 0.057 | 0.050 | 0.000 | 0.095 | 0.000 |
| Flame retardancy (1 mmt) | Number of drips/5 |  | 0 | 0 | 0 | 4 | 0 | 0 |
|  |  |  | V-0 | V-0 | V-0 | V-2 | V-0 | V-0 |
| Total light transmittance | 1 mmt | % | 85 | 85 | 84 | 84 | 78 | 77 |
|  | 3 mmt | % | 71 | 71 | 67 | 68 | 58 | 53 |
|  | 3 mmt/1 mmt |  | 0.84 | 0.84 | 0.80 | 0.81 | 0.74 | 0.69 |
|  | Evaluation of 3 mmt/1 mmt |  | B | B | B | B | C | D |
| Aggregation of PTFE |  |  | B | B | B | B | C | C |

TABLE 5

|  |  |  | Example | | Comparative Example | |
|---|---|---|---|---|---|---|
|  |  |  | 33 | 34 | 7 | 8 |
| PC-based resin (A) | | | | | | |
| (A-1) | Branched PC1 (0.4 mol %) | mass % | | | | |
|  | Branched PC2 (0.9 mol %) | mass % | 70 | 70 | 70 | 70 |
|  | Branched PC3 (1.5 mol %) | mass % | | | | |
|  | Branched PC4 (2.3 mol %) | mass % | | | | |
| (A-2) | FN2500 | mass % | 30 | 30 | 30 | 30 |
|  | FN1700 | mass % | | | | |
| Branching mol | | mol % | 0.63 | 0.63 | 0.63 | 0.63 |
| Fluorine-containing compound (B) | | | | | | |
| (B-1) | PTFE1 (A3800) | part by mass | | | | |
|  | PTFE2 (D210C) | part by mass | 0.10 | 0.10 | 0.10 | 0.10 |
| PTFE content | | part by mass | 0.06 | 0.06 | 0.06 | 0.06 |
| (B-2) | EFTOP KFBS | part by mass | 0.10 | 0.10 | 0.10 | 0.10 |
| Amount of fluorine-containing compound (B) | | part by mass | 0.16 | 0.16 | 0.16 | 0.16 |
| Polyether (C) | | | | | | |
|  | (C1) PEG-PPG | part by mass | 0.20 | 0.20 | | |
|  | (C2) PPG | part by mass | | | | |
|  | (C3) PEG | part by mass | | | | |
|  | (C4) PPG-PTMG | part by mass | | | | |
|  | (C5) PEG-PTMG | part by mass | | | | |
|  | (C6) PTMG | part by mass | | | | |
|  | (C7) P03G | part by mass | | | | |
| Antioxidant | | | | | | |
|  | Dover28 | part by mass | 0.05 | 0.05 | 0.05 | 0.05 |
|  | Irg 168 | part by mass | | | | |
|  | PEP-36 | part by mass | | | | |
|  | Irg 1076 | part by mass | | | | |
| Flame retardant | KR-511 | part by mass | | | | |
| UV absorber | ChemiSorb 79 | part by mass | | | | |
|  | UV-3638 | part by mass | | | | |
| Light diffuser | KMP590 | part(s) by mass | 1.00 | 2.00 | 1.00 | 2.00 |
| (B)/(C) | | | 0.80 | 0.80 | — | — |
| PTFE/(C) | | | 0.30 | 0.30 | — | — |
| PTFE*Branching mol | | | 0.038 | 0.038 | 0.038 | 0.038 |
| Flame retardancy (1 mmt) | Number of drips/5 | | 0 | 0 | 0 | 0 |
|  | | | V-0 | V-0 | V-0 | V-0 |
| Total light transmittance | 1 mmt | % | 64 | 59 | 63 | 58 |
|  | 3 mmt | % | 50 | 45 | 47 | 42 |
|  | 3 mmt/1 mmt | | 0.78 | 0.76 | 0.75 | 0.72 |
|  | Evaluation of 3 mmt/1 mmt | | B | B | C | C |

It is found from the results of Tables 1 to 5 that the polycarbonate-based resin composition of the present invention has a high total light transmittance even at a thickness of 3 mm, and hence is excellent in transparency. The aggregation of PTFE does not pose a problem, and does not adversely influence the transparency. In addition, it is found that the polycarbonate-based resin composition of the present invention is also excellent in thin-wall flame retardancy at a thickness of 1 mm.

As the addition amount of PTFE increases, the ratio of 3 mmt/1 mmt tends to become smaller, suggesting that PTFE influences the transparency. However, the polycarbonate-based resin composition of the present invention shows a solution to this problem. For example, in the comparison between Example 17, in which the polyether was added in a specific amount, and Comparative Example 3, in which no polyether was added, Example 17 is more excellent in total light transmittance at 3 mmt and also has a larger ratio of 3 mmt/1 mmt, indicating a smaller difference in transparency depending on the thickness. In addition, it is found from the results of the degree of aggregation of PTFE based on visual observation that the aggregation of PTFE is further suppressed by adding the polyether. When Example 29 and Comparative Example 4, Example 31 and Comparative Example 5, or Example 32 and Comparative Example 6 are compared to each other, it is found that the addition of the polyether reduces the difference in transparency depending on the thickness, and further suppresses the aggregation of PTFE. In particular, in Example 31 and Example 32, although the amount of PTFE is relatively large, the difference in transparency depending on the thickness is small and the aggregation of PTFE is also suppressed, as compared to Comparative Example 5 and Comparative Example 6 having compositions identical to Example 31 and Example 32, respectively, except for including no polyether.

INDUSTRIAL APPLICABILITY

The molded article formed of the polycarbonate-based resin composition of the present invention is excellent in transparency. In addition, the polycarbonate-based resin composition of the present invention can be excellent in both of transparency and flame retardancy, in particular, thin-wall flame retardancy. The molded article is suitable as various optical molded articles, for example, lighting equipment diffusion covers each made of a resin, such as a lighting cover and a display cover, and a lens.

The invention claimed is:

1. A polycarbonate-based resin composition, comprising:
   100 parts by mass of a polycarbonate-based resin (A) comprising 50-100 mass % of a branched polycarbonate-based resin (A-1) and optionally, an aromatic polycarbonate-based resin (A-2) except the branched polycarbonate-based resin (A-1), wherein a branching ratio of the branched polycarbonate-based resin (A-1) is 0.45 to 2.30 mol %;
   0.16-0.19 parts by mass of a fluorine-containing compound (B) comprising fluorine-containing compounds (B1) and (B2), wherein the compound (B1) is a polytetrafluoroethylene and the compound (B2) is a perfluoroalkylsulfonic acid metal salt; and
   a polyether (C) having a polyoxyalkylene structure,
   wherein the polycarbonate-based resin composition is free of a light diffuser,
   wherein a content of the polyether (C) having a polyoxyalkylene structure is 0.1 part by mass or more and 0.6 parts by mass or less with respect to 100 parts by mass of the polycarbonate-based resin (A),
   wherein a mass ratio of the fluorine-containing compound (B) to the polyether (C) is 15.00 or less, and
   wherein the content of the fluorine-containing compound (B1) is 0.13 part by mass or less with respect to 100 parts by mass of the polycarbonate-based resin (A),
   wherein a product of the content of the fluorine-containing compound (B1) with respect to 100 parts by mass of the polycarbonate-based resin (A) and the branching ratio in the polycarbonate-based resin (A) is 0.050 or more and 0.2 or less,
   wherein a total light transmittance of a 3-millimeter thick portion of the polycarbonate-based resin composition measured by the following method A is 70% or more:
   Method A: a test piece that is a three-stage plate measuring 90 mm×50 mm, including the 3-millimeter thick portion measuring 45 mm×50 mm, a 2-millimeter thick portion measuring 22.5 mm×50 mm, and a 1-millimeter thick portion measuring 22.5 mm×50 mm, is produced using a pellet obtained from the polycarbonate-based resin composition by an injection molding method at a molding temperature of 310° C. and a mold temperature of 95° C., and is subjected to measurement of the total light transmittance in conformity with JIS K 7375:2008, and
   wherein, when the polycarbonate-based resin composition is molded to have a thickness of 1.0 mm, the polycarbonate-based resin composition has a V-0 flame retardancy rank under a UL94 standard.

2. The polycarbonate-based resin composition according to claim 1, wherein the polytetrafluoroethylene is an aqueous dispersion-type or acryl-coated polytetrafluoroethylene.

3. The polycarbonate-based resin composition according to claim 1, wherein the perfluoroalkylsulfonic acid metal salt is potassium nonafluorobutanesulfonate.

4. The polycarbonate-based resin composition according to claim 1, wherein the fluorine-containing compound (B) has an average particle diameter of 0.05 μm or more and 1.0 μm or less.

5. The polycarbonate-based resin composition according to claim 1, wherein the polyether (C) has a number-average molecular weight of 200 or more and 10,000 or less.

6. The polycarbonate-based resin composition according to claim 1, wherein the polyether (C) is at least one kind selected from the group consisting of polyethylene glycol, polypropylene glycol, polyoxytrimethylene glycol, polyoxytetramethylene glycol, polyoxyethylene glycol-polyoxypropylene glycol, polyoxytetramethylene glycol-polyoxypropylene glycol, and polyoxytetramethylene glycol-polyoxyethylene glycol.

7. The polycarbonate-based resin composition according to claim 1, further comprising a flame retardant.

8. The polycarbonate-based resin composition according to claim 1, further comprising an antioxidant.

9. The polycarbonate-based resin composition according to claim 1, further comprising a UV absorber.

10. The polycarbonate-based resin composition according to claim 1, wherein a ratio between the total light transmittance of the 3-millimeter thick portion and a total light transmittance of the 1-millimeter thick portion (total light transmittance at a thickness of 3 mm/total light transmittance at a thickness of 1 mm), which are measured by the method A, is 0.70 or more.

11. A molded article, comprising the polycarbonate-based resin composition of claim 1.

* * * * *